United States Patent
D'Souza et al.

(10) Patent No.: US 11,501,080 B2
(45) Date of Patent: Nov. 15, 2022

(54) SENTENCE PHRASE GENERATION

(71) Applicant: ACCENTURE GLOBAL SOLUTIONS LIMITED, Dublin (IE)

(72) Inventors: Shaun Cyprian D'Souza, Mumbai (IN); Subhashini Lakshminarayanan, Chennai (IN); Gopali Raval Contractor, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 545 days.

(21) Appl. No.: 16/730,093

(22) Filed: Dec. 30, 2019

(65) Prior Publication Data
US 2021/0200954 A1 Jul. 1, 2021

(51) Int. Cl.
*G06F 40/00* (2020.01)
*G06F 40/30* (2020.01)
(Continued)

(52) U.S. Cl.
CPC .......... *G06F 40/30* (2020.01); *G06F 16/2228* (2019.01); *G06F 16/243* (2019.01); *G06N 3/008* (2013.01); *G06N 5/04* (2013.01); *G06N 20/00* (2019.01); *G06F 40/205* (2020.01); *G06F 40/295* (2020.01)

(58) Field of Classification Search
CPC .. G06F 16/903; G06F 16/9538; G06F 40/295; G06F 40/30; G06F 16/3325; G06F 16/3344; G06F 16/3329; G06F 16/3326; G06F 16/3331; G06F 16/3347; G06F 40/00; G06F 40/10; G06F 40/20; G06F 40/253;
(Continued)

(56) References Cited

U.S. PATENT DOCUMENTS 10,747,651 B1 * 8/2020 Vanderwall ......... G06F 11/3684
10,789,553 B1 * 9/2020 Bhatwadekar ...... G06F 16/9535
(Continued)

OTHER PUBLICATIONS

Liu, H. (2019). Conditioning LSTM Decoder and Bi-directional Attention Based Question Answering System. arXiv preprint arXiv: 1905.02019. (Year: 2019).*
(Continued)

*Primary Examiner* — Edgar X Guerra-Erazo
(74) *Attorney, Agent, or Firm* — Mannava & Kang, P.C.

(57) ABSTRACT

Examples of a sentence phrasing system are provided. The system may obtain a user question from a user. The system may obtain question entailment data from a plurality of data sources. The system may implement an artificial intelligence component to identify a word index from the question entailment data and to identify a question premise from the user question. The system may implement a first cognitive learning operation to determine an answer premise corresponding to the question premise comprising a second-word data set. The system may determine a subject component corresponding to the question premise. The system may generate an object component and a predicate component from the second-word data set corresponding to the subject component. The system may generate an integrated answer relevant for resolving the user question and comprising the subject component, the object component, and the predicate component concatenated to form an answer sentence.

20 Claims, 26 Drawing Sheets

(51) Int. Cl.
  *G06N 20/00* (2019.01)
  *G06F 16/22* (2019.01)
  *G06F 16/242* (2019.01)
  *G06N 5/04* (2006.01)
  *G06N 3/00* (2006.01)
  *G06F 40/295* (2020.01)
  *G06F 40/205* (2020.01)

(58) Field of Classification Search
  CPC .... G06F 40/268; G06F 40/274; G06F 40/279; G06F 40/289; G06F 40/35; G06N 3/02; G06N 3/08; G06N 3/082; G06N 20/00
  See application file for complete search history.

(56) References Cited

U.S. PATENT DOCUMENTS

| | | | | |
|---|---|---|---|---|
| 10,860,630 | B2* | 12/2020 | Blouw | G06N 3/084 |
| 10,915,562 | B2* | 2/2021 | Erpenbach | G06F 16/3334 |
| 11,176,598 | B2* | 11/2021 | D'Souza | G06N 3/084 |
| 2017/0193086 | A1* | 7/2017 | Zeng | G06N 5/04 |
| 2018/0018573 | A1* | 1/2018 | Henderson | G06N 20/00 |
| 2018/0107940 | A1* | 4/2018 | Lieberman | G06N 20/00 |
| 2019/0370389 | A1* | 12/2019 | Blouw | G06F 40/30 |
| 2020/0184540 | A1* | 6/2020 | D'Souza | G06N 3/084 |
| 2020/0184959 | A1* | 6/2020 | Yasa | G10L 15/1815 |
| 2021/0201197 | A1* | 7/2021 | Shrikant Nikumb | G06F 16/2379 |

OTHER PUBLICATIONS

Wang, W., Yang, N., Wei, F., Chang, B., & Zhou, M. (Jul. 2017). Gated self-matching networks for reading comprehension and question answering. In Proceedings of the 55th Annual Meeting of the Association for Computational Linguistics (vol. 1: Long Papers) (pp. 189-198). (Year: 2017).*

Bauer, L., Wang, Y., & Bansal, M. (2018). Commonsense for generative multi-hop question answering tasks. arXiv preprint arXiv: 1809.06309. (Year: 2018).*

* cited by examiner

SENTENCE PHRASE GENERATION

BACKGROUND

Textual entailment relates to a directional relationship between text fragments in a text document, based on a natural language processing operation. The directional relationship in textual entailment may be based on mimicking the cognitive comprehension of a human being. For example, the directional relationship may hold whenever the truth of one text fragment follows from another text fragment. Such a relationship may be used for generating contextual answer responses to a user question and passage input.

Many approaches have been considered for generating contextual answer responses. These approaches include, for example, Applications like Machine Reading Comprehension (MRC) use a SQuAD 2.0 dataset to train a Bi-Directional Attention Flow (BiDAF) model for the task of generating contextual answer responses to a user question and passage input. These models may deploy a combination of query generation, a keyword search using a knowledge base and answer ranking to determine answer information. Various other models used in reading comprehension may have been trained to provide abbreviated answer responses for a given question-passage pair.

However, these models may lack the availability of qualitative sentence responses in the answer string. For example, various questions may require an answer including information regarding various people, places, ideas or things. Such questions may not be adequately processed by many approaches presently deployed for generating contextual answer responses.

Therefore, to ensure efficiency and completeness, an answer entailment technique may be required to ensure that a natural language text response including natural language semantics be provided for a user question based on an input passage. There is a requirement for the creation of an approach for generating contextual answer responses based on a dataset such as, for example, the SQuAD dataset, to include phrasal responses. There is also a need for an answer phrasing system, which may transform the entailment operations for generating insight-driven semantic triplets and phrase an answer sentence therefrom, such that the answers generated may comprise a noun to verb grammatical connection for emulating a natural language response.

Accordingly, a technical problem with the currently available systems for generation of contextual answer responses to a user question and passage input is that they may be inefficient, inaccurate, and/or not scalable. There is a need for a sentence phrasing system that may account for the various factors mentioned above, amongst others, for establishing multi-dimensional grammatical relationships emulating natural language responses between questions posed by a user and various text fragments from a text document in an efficient, and cost-effective manner.

DETAILED DESCRIPTION

Figure 1:
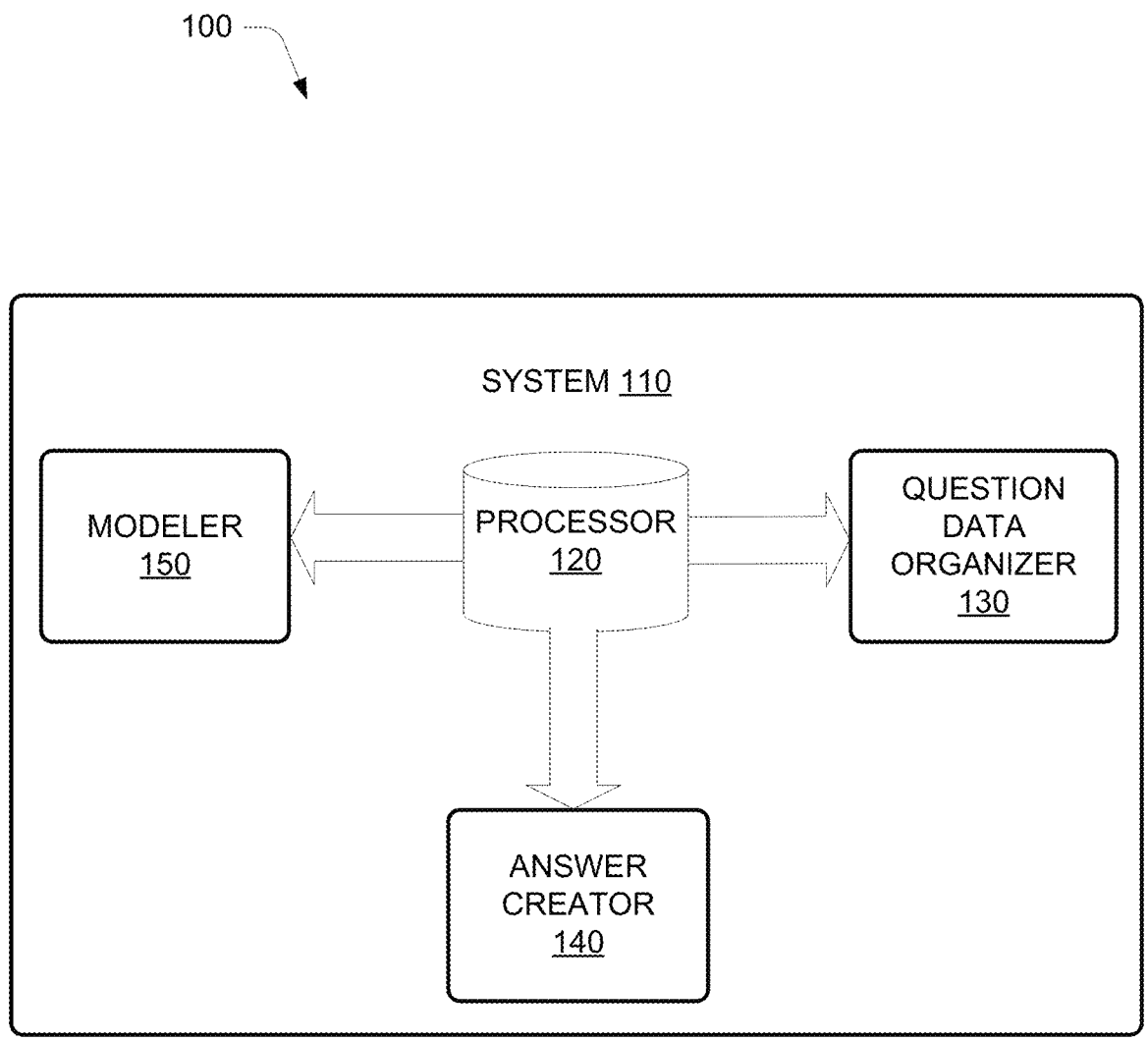
FIG. 1 illustrates a diagram for a sentence phrasing system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for sentence phrasing including a sentence phrasing system. The sentence phrasing system (referred to as "system" hereinafter) may be used to generate contextual answers based on a user question and an input passage. The answer generation may have applications in a variety of industry domains, such as, for example, healthcare, finance, and technology (web search), pharmacovigilance, a Turing test, various automated customer care units and the like. The system may capture semantic reasoning abilities used in a broad set of applications like question answering, information retrieval, information extraction, text summarization, and machine comprehension. The system may generate a set of sematic triplets for a given text for generating phrasal responses for a given seed sentence. In an example, the system may determine an object component, a subject component and a predicate component relevant to a user question based on the input passage. The system may be based on Natural language Reading comprehension and may have an application in a variety of industries. Some key use cases may include, for example, automation of responses on a policy document query, enabling a set of Frequently Asked Questions (FAQs) for virtual agents. In an example, the probable datasets deployed by the system may be policy documents, medical case reports and product catalogs. The system may enable an efficient way for building intelligence into, for example, virtual agents along with the ability to produce human-ready prose based on unstructured text.

The system may deploy various word vector models and deep learning models to construct an answer to the user question from the object component, the subject component and the predicate component. In accordance with various embodiments of the present disclosure, the system may be a neural network model to generate Natural Language Phrase (NLP) responses for applications in Question answering (QA) and reading comprehension from various models, for example, a Bi-Directional Attention Flow (BiDAF) deep learning model.

The system may include a processor, a question data organizer, an answer creator, and a modeler. The processor may be coupled to the question data organizer, the answer creator, and the modeler. The question data organizer may obtain a query from a user. The query may be indicating a data entailment requirement comprising a user question. The question data organizer may obtain question entailment data associated with the user question from a plurality of data sources. The question data organizer may implement an artificial intelligence component to identify a word index from the question entailment data. The word index may be including a plurality of words being associated with the data entailment requirement. The question data organizer may implement an artificial intelligence component to identify a question premise from the user question. The question premise may be comprising a first word data set associated with the word index.

The answer creator may implement a first cognitive learning operation to determine an answer premise corresponding to the question premise. The answer premise may be comprising a second-word data set and indicating an inference associated with the user question. The second-word data set may be being associated with the word index. The modeler may implement a second cognitive learning operation to determine a subject component from the second-word data set. The subject component indicating a person, a place, a thing, or an idea associated with the question premise. The modeler may implement a second cognitive learning operation to determine an object component from the second-word data set. The object component may be indicating a person, a place, a thing, and an idea associated with the subject component. The modeler may implement a second cognitive learning operation to determine a predicate component from the second-word data set. The predicate component may be indicating an action associated with the subject component. The modeler may implement a second cognitive learning operation to generate an integrated answer relevant to resolving the user question. The integrated answer may be comprising the subject component, the object component, and the predicate component associated with the question premise concatenated to form an answer sentence.

The embodiments for the data entailment requirement presented herein are exemplary in nature and should be treated as such. For the sake of brevity and technical clarity, the description of the sentence phrasing system may be restricted to few exemplary embodiments, however, to a person skilled in the art it should be clear that the system may be used for the fulfillment of various contextual answer generations and data entailment requirements other than those mentioned hereinafter.

Accordingly, the present disclosure aims to provide a sentence phrasing system that may account for the various factors mentioned above, amongst others, to multi-dimensional grammatical relationships between various text fragments from a text document in an efficient, and cost-effective manner. Furthermore, the present disclosure may categorically analyze various parameters that may have an impact on deciding an appropriate contextual answer based on a user question and from a given text document.

FIG. 1 illustrates a system for sentence phrasing system 110 (referred to as system 110 hereinafter), according to an example implementation of the present disclosure. In an example, the system 110 may include a processor 120. The processor 120 may be coupled to a question data organizer 130, an answer creator 140 and a modeler 150.

In accordance with an embodiment of the present disclosure, the question data organizer 130 may obtain a query from a user. The query may be indicating a data entailment requirement comprising a user question. The data entailment requirement may be associated with at least one of a process, an organization, and an industry-relevant for entailment operations like the generation of contextual answers based on the user question. In an example, the data entailment requirement may indicate a requirement, which may refer to a purpose of generating insights from a text document in an automated manner. For example, the purpose may a query from a user-related to an insurance policy document. The insurance policy document may be a complex document describing various details and various related indemnities, entities, and the like. It may contain various exceptions, and various payment restrictions based on various circumstances, and the like. In addition to identifying various entities, it may also be important to a user to identify payment restrictions in case the insurance policy may need to be claimed.

The textual entailment may facilitate in providing an answer to key questions about the insurance policy document. The purpose of the data entailment requirement may be to understand and evaluate possible demographic regions or a geographical location by an organization for augmenting understanding regarding market requirements so as to adopt a more insight-driven approach towards sales and marketing. The purpose of the data entailment requirement may be to analyze various finance dossiers for generating insights related to various financial operations. The purpose of the data entailment requirement may be to capture semantic reasoning abilities, which may be used in a broad set of applications like question answering, information retrieval, information extraction, text summarization, and machine comprehension. The embodiments for the data entailment requirements presented herein are exemplary in nature and should be treated as such.

The question data organizer 130 may obtain question entailment data associated with the user question from a plurality of data sources. The question entailment data may be a dataset relevant to the user question. The question entailment data may be a text document provided by a user to the system or may be a text document stored in the system 110. In an example, the question entailment data may include medical literature related to a medical product, medical records related to various patients suffering from a medical condition, pharmacovigilance agreements, various customer interactions, and product dossiers, various insurance policy documents, various insurance coverage information documents and the like. In accordance with various embodiments of the present disclosure, the question entailment data may be in a portable document format (pdf), a doc/Docx format, a text format, a text from web scraper format, a rich text format (RTF), a Hypertext Markup Language (HTML) format. For the sake of brevity and technical clarity, other formats of the question entailment data have not been mentioned herein, by should be clear to a person skilled in the art.

In an example, the plurality of data sources may further include a natural language data directory. The natural language data directory may be a pre-existing text corpus stored in the system 110. The text corpus may refer to a large and structured set of texts that may be used to do a statistical analysis, hypothesis testing, checking occurrences or validating linguistic rules within a specific language territory. In an example, the text corpus may be the Stanford Natural Language Inference (SNLI) text corpus comprising a collection of labeled sentence pairs. For the sake of brevity and technical clarity, details about the SNLI have not been mentioned herein but should be clear to a person skilled in the art. The SNLI text corpus may be used to determine an entailment, a contradiction, and a piece of neutral information for a three-way task challenge on 570,000 labeled sentence pairs. In an example, the natural language data directory may be the Stanford Question Answering Dataset (SQuAD), which may be a reading comprehension dataset, consisting of questions posed by crowd workers on a set of articles, where the answer to every question is a segment of text, or span, from the corresponding reading passage, or the question might be unanswerable. In accordance with various embodiments of the present disclosure, the question entailment data may include a text document relevant to the user question, and the natural language data directory.

The question data organizer 130 may implement an artificial intelligence component to identify a word index from the question entailment data. In accordance with various embodiments of the present disclosure, the artificial intelligence component may include artificial intelligence techniques, for example, a Natural Language Processing (NLP) model. In an example, the NLP model may be developed using the Language Understanding Intelligent Service (LUIS). In an example, the NLP application may be development of a neural network with open information extraction systems like Knowledge graphs, and Never-Ending Language Learning (NELL), that may be used in mining the vast repository of the web and building a knowledge system, in the form of interrelated facts or a knowledge graph (described in detail by way of FIG. 4 and FIG. 5). This extracted knowledge may be used to provide reasoning and inference on the set of entities, their attributes, and their interrelations. The system 110 may deploy any of the NLP models not mentioned herein for identifying the word index from the question entailment data. In accordance with various embodiments of the present disclosure, the NLP models may be developed in an AllenNLP™ environment. For the sake of brevity and technical clarity further details regarding various NLP models may be not be described herein, however, the same should be clear to a person skilled in the art.

The word index may be including a plurality of words being associated with the data entailment requirement. The artificial intelligence component may map a set of words from the text document relevant to the user question with the text corpus to identify the words index. The word index may include the plurality of words, which may be present in the text document relevant to the user question and may be present as labeled sentence pairs in the text corpus. In an example, the system may identify the word index based on the SQuAD2.0 dataset. In an example, the text document relevant to the user question may include " . . . We will pay You (or, if You request, the owner of the property) for loss of or damage as a result of fire, theft or accidental damage to Personal belongings which are in or on Your Car. We will NOT pay more than 500 in any one Complete Year of Insurance; We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates) . . . ". The question data organizer 130 may identify the word index to include the plurality of words such as "We", "will", "pay", "You", "(or,", "if", "You", "request,", "the", "owner", "of", "the", "property)", "for", "loss", "of", "or", "damage", "as", "a", "result", "of", "fire,", "theft", "or", "accidental", "damage", "to", "Personal", "belongings", "which", "are", "in", "or", "on", "Your", "Car.", "We", "will", "NOT", "pay", "more", "than", "500", "in", "any", "one", "Complete", "Year", "of", "Insurance;", "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser,", "cards,", "stamps,", "tickets,", "documents,", "financial", "securities", "and", "share", "certificates) . . . ". The question data organizer 130 may implement the artificial intelligence component to map the word index with the natural language data directory to derive a context of each of the plurality of words.

In accordance with various embodiments of the present disclosure, the question data organizer 130 may implement the artificial intelligence component to assign a numeral symbol to each of the words in the word index. For example, the word "We" may be assigned a numeral symbol "1", the word "will" may be assigned a numeral symbol "2", and so on until the word "certificates" may be assigned a numeral symbol "106".

The question data organizer 130 may implement the artificial intelligence component to identify a question premise from the user question. The question premise may be comprising a first word data set associated with the word index. In an example, the question premise may be a text fragment segmented from the user question by the question data organizer 130. The question premise may be the text fragment from the user question, which may be identified by the artificial intelligence component for generating a contextual answer insight. In an example, the question data organizer 130 may identify multiple question premises for a given user question.

The first word data set included in the question premise may be a set of words that may form the text fragment, which may be identified as the question premise by the artificial intelligence component. In an example, the question premise identified from the user question may be "What is the coverage for lost money?". The first word data set for the question premise may include words such as "What", "is", "the", "coverage", "for", "lost", "money", and "?".

The answer creator 140 may implement a first cognitive learning operation to determine an answer premise corresponding to the question premise. The first cognitive learning operation may include implementing a Bi-Directional Attention Flow mechanism in a Deep Learning LSTM network to determine an answer start, and answer end and span information. The span information may refer to the numeral symbol from the word index corresponding to the answer start and the answer end. In an example, the AllenNLP may provide a BiDAF model that may be trained on the SQuAD dataset. An AllenNLP environment may be created to train and evaluate the BiDAF model. The SQuAD dataset may comprise, for example, 442 training sets and 48 dev sets. The dev set may be a validation set of data used to train the first cognitive learning operation with an objective of finding and optimizing the best deep learning model to solve a given data entailment requirement. The training sets and the dev sets may be available as a JSON formatted data file. The first cognitive learning operation may further include implementing various machine learning techniques such as word embedding algorithms like Glove, Keras embedding algorithm and the like. In an example, various machine learning algorithms such as TensorFlow, SpaCy, PyTorch and the like may be used for deriving a decomposable attention model. In an example, the decomposable attention model may be a recurrent Neural Network-based attention model. The Recurrent Neural Network (RNN) may be a type of Neural Network where the output from a previous step may be fed as input to a current step. The RNN may be deployed to predict the next word of a sentence, the previous words are required and hence there may be a need to remember the previous words. The system 110 may deploy various RNN based models as part of the first cognitive learning operation for generation of the answer premise corresponding to the question premise. In an example, the answer creator 140 may identify the answer premise corresponding to each of the question premises identified by the question data organizer 130 for a given set of question entailment data.

The answer premise may indicate an inference associated with the user question. The inference may indicate an implication, which may be derived by the answer creator 140 for the user question. The answer creator 140 may implement the first cognitive learning operation to map the first word data set from the question premise onto the context of the word index to derive the context of the question premise. In an example, the answer creator 140 may implement the first cognitive learning operation to map the first word data set from the question premise onto the natural language data directory to derive the context of the question premise. The context of the question premise may be deployed to generate the corresponding answer premise from within the word index. For example, as mentioned above, the word index may include the plurality of words such as "We", "will", "pay", "You", "(or,", "if", "You", "request,", "the", "owner", "of", "the", "property)", "for", "loss", "of", "or", "damage", "as", "a", "result", "of", "fire,", "theft", "or", "accidental", "damage", "to", "Personal", "belongings", "which", "are", "in", "or", "on", "Your", "Car.", "We", "will", "NOT", "pay", "more", "than", "500", "in", "any", "one", "Complete", "Year", "of", "Insurance;", "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates) . . . " and the question premise may include the first word data set such as "What", "is", "the", "coverage", "for", "lost", "money", and "?". The answer creator 140 may implement the first cognitive learning operation to map the first word data set from the question premise onto the context of the word index to derive the context of the question premise. The context of the question premise may be deployed to generate the corresponding answer premise from within the word index. For example, in the example mentioned above, the answer creator 140 may implement the first cognitive learning operation to derive the context of the question premise that may be related to "money" and "coverage for money". Therefore, the answer premise may include the text fragment from the text document from the question entailment data relevant to the "money" and "coverage for money" such as for example, "We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates)"

The answer premise may be comprising a second-word data set. Each of the answer premise may include the second-word data set. The second-word data set may be associated with the word index. As mentioned above, the word index may be derived based on a pre-existing text corpus with labeled sentence pairs and linguistic rules. The second-word data set may be a set of words identified by the answer creator 140 from the word index based on the context of the question premise as identified by the first word data set to convey an implication of the context of the question premise. For example, the answer premise as identified in aforementioned example may be "We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates)" and the second-word data set may include words such "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates".

In accordance with various embodiments of the present disclosure, the answer creator 140 implements the first cognitive learning operation to create an answer map associated with the question premise by mapping the second-word data set with the first word data set. The answer creator 140 may map a set of words from the first word data set with a set of words from the second-word data set to derive a relationship between the words present in the question premise with regard to words present in the answer premise. Such a relationship may be depicted as the answer map (described in further detail by way of FIG. 4 and FIG. 5). In an example, the answer map may facilitate the determination of the answer premise from the question premise.

The modeler 150 may implement a second cognitive learning operation to determine a subject component from the second-word data set. The subject component indicating a person, a place, a thing, or an idea associated with the question premise. In an example, the second cognitive learning operation may be a deep learning neural network model to determine a natural language grammatical relationship. For example, the AllenNLP may provide a trained BiDAF pickled binary model for the task of Machine Reading Comprehension (MRC). The second cognitive learning operation may include using semantic triples in applications in a semantic web environment. In an example, the second cognitive learning operation may include the deployment of software such as Web Ontology Language (OWL) and Resource Description Framework (RDF). The semantic ontology software may have applications in the Semantic web. These may include data formats such as RDF, OWL, and SPARQL. The SPARQL may refer to an RDF query language that may be a semantic query language for databases. The SPARQL may be able to retrieve and manipulate data stored in Resource Description Framework (RDF) format. In addition to the knowledge base contained in the semantic triplets, the text document from the question entailment data may provide the key constituents of a phrase grammar with the subject, verb and object pieces of a sentence. These may be used in a natural language grammar for clause and phrase construction. For example, projects like ClueWeb™, OpenIE™, and Wikipedia™ may provide a corpus of text data that may be used for ontological engineering. In an example, the second cognitive learning operation may deploy parser extraction of triples techniques that may use a constituency parser. In an example, the second cognitive learning operation may deploy software such as ClausIE™, OLLIE™ that may use a dependency parser to output a set of word triples. In an example, the second cognitive learning operation may deploy a triple parser in the creation of a synthetic data set to input to the BiDAF model. Additionally, the AllenNLP environment may provide a deep learning framework using PyTorch™ and the GloVe™ word embeddings. The deep learning framework may support retraining of the BiDAF model using an input in form of a JavaScript Object Notation (JSON) format. In an example, the system 110 may deploy the synthesized dataset to retrain the AllenNLP BiDAF model. The retrained model file may be used for generating grammatical clauses and phrases for generating the answer for the user question.

As mentioned above, the modeler 150 may implement the second cognitive learning operation to determine the subject component from the second-word data set. The subject component may be indicating a person, a place, a thing, or an idea associated with the question premise. For example, the second word dataset may include words such as "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates", and the user question may be "What is the coverage for lost money?" Therefore, the modeler 150 may implement the second cognitive learning operation to determine the subject component as "We".

The modeler 150 may implement the second cognitive learning operation to determine an object component from the second-word data set. The object component may be indicating a person, a place, a thing, and an idea associated with the subject component. For example, in case of the second word dataset mentioned above, the object component may be identified to include words such as "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates".

The modeler 150 may implement a second cognitive learning operation to determine a predicate component from the second-word data set. The predicate component may be indicating an action associated with the subject component. For example, in the case of the second word dataset mentioned above, the predicate component may be identified to include words such as "not", and "pay".

The modeler 150 may implement a second cognitive learning operation to generate an integrated answer relevant to resolving the user question. The integrated answer may be comprising the subject component, the object component, and the predicate component associated with the question premise concatenated to form an answer sentence. For example, the modeler 150 may generate the integrated answer to be "We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates)". The integrated answer may include the subject component in the form of "We". The integrated answer may include the object component in form of "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates". The integrated answer may include the predicate component in form of "not", and "pay". The modeler 150 may generate the integrated answer by adding words such as "will" and other ancillary words. In an example, the modeler 150 may implement they may implement the second cognitive learning operation to determine the set of ancillary words to be used for the generation of the integrated answer from the word index.

In accordance with various embodiments of the present disclosure, the modeler 150 may implement the second cognitive learning operation to map the numeral symbol for each of the words in the word index with the first word data set to determine a question premise index. The question premise index may include the numeral symbol assigned to a word from the plurality of words from the word index mapped onto the corresponding word from the first word data set.

In accordance with various embodiments of the present disclosure, the modeler 150 may implement the second cognitive learning operation to map the numeral symbol for each of the words in the word index with the second-word data set to determine an answer premise index. The answer premise index may include the numeral symbol assigned to a word from the plurality of words from the word index mapped onto the corresponding word from the second-word data set. For example, as mentioned above the word index may include the plurality of words such as "We", "will", "pay", "You", "(or,", "if", "You", "request,", "the", "owner", "of", "the", "property)", "for", "loss", "of", "or", "damage", "as", "a", "result", "of", "fire,", "theft", "or", "accidental", "damage", "to", "Personal", "belongings", "which", "are", "in", "or", "on", "Your", "Car.", "We", "will", "NOT", "pay", "more", "than", "500", "in", "any", "one", "Complete", "Year", "of", "Insurance;", "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates) . . . ". The question data organizer 130 may implement the artificial intelligence component to assign the word "We" may be assigned a numeral symbol "52", the word "will" may be assigned a numeral symbol "53", the word "NOT" may be assigned a numeral symbol "53", and so on until the word "certificates" may be assigned a numeral symbol "106". As mentioned above the user question for this example, may be "What is the coverage for lost money?" and the second-word data set determined based on the answer premise for aforementioned user question determined by the answer creator 140 may include words such as "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates". The answer premise index would include the numeral symbol assigned to each of the words from the plurality of words that may be mapping onto the second-word data set. The answer premise index may include the numeral symbol numeral symbol from the word index corresponding to the answer start and the answer end. For example, answer premise index may include the numeral symbol "52" for the word "We" and may include the numeral symbol "106" for the word "certificates". In an example, the answer premise index may include the numeral symbol from the word index corresponding to the answer start. The answer premise index may facilitate the generation of the span information for a contextual answer.

In accordance with various embodiments of the present disclosure, the modeler 150 may create a user question library comprising the user question and the answer sentence associated with the user question. The modeler 150 may deploy the user question library for generating an answer for a subsequent query.

The embodiments for the artificial intelligence component, the first cognitive learning operations, and the second cognitive learning operations presented herein are exemplary in nature and should be treated as such. For the sake of brevity and technical clarity, the description of the sentence phrasing system may be restricted to few exemplary embodiments, however, to a person skilled in the art it should be clear that the system may be used for the fulfillment of various answer generation and textual entailment requirements other than those mentioned hereinafter.

Figure 2:
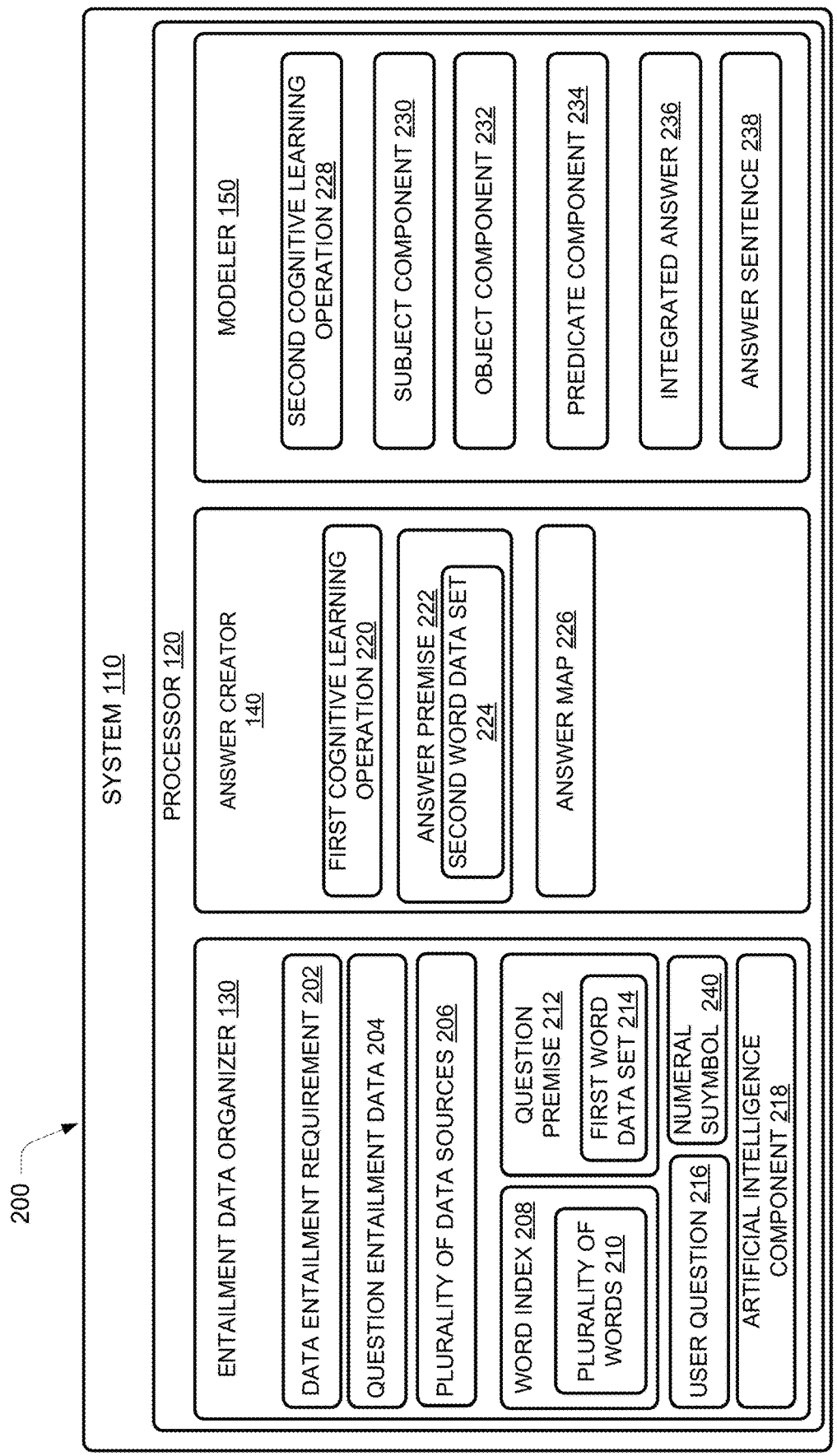
FIG. 2 illustrates various components of a sentence phrasing system, according to an example embodiment of the present disclosure.

FIG. 2 illustrates various components of the sentence phrasing system 110, according to an example embodiment of the present disclosure. In an example, the system 110 may include the processor 120. The processor 120 may be coupled to the question data organizer 130, the answer creator 140 and the modeler 150.

In accordance with an embodiment of the present disclosure, the question data organizer 130 may obtain a query from a user. The query may be indicating a data entailment requirement 202 comprising a user question 216. The data entailment requirement 202 may be associated with at least one of a process, an organization, and an industry-relevant for entailment operations like the generation of contextual answers based on the user question 216. In an example, the data entailment requirement 202 may indicate a requirement, which may refer to a purpose of generating insights from a text document in an automated manner. For example, the purpose may a query from a user-related to an insurance policy document. The insurance policy document may be a complex document describing various details and various related indemnities, entities, and the like. It may contain various exceptions, and various payment restrictions based on various circumstances, and the like. In addition to identifying various entities, it may also be important to a user to identify payment restrictions in case the insurance policy may need to be claimed.

The textual entailment may facilitate in providing an answer to key questions about the insurance policy document. The purpose of the data entailment requirement 202 may be to understand and evaluate possible demographic regions or a geographical location by an organization for augmenting understanding regarding market requirements so as to adopt a more insight-driven approach towards sales and marketing. The purpose of the data entailment requirement 202 may be to analyze various finance dossiers for generating insights related to various financial operations. The purpose of the data entailment requirement 202 may be to capture semantic reasoning abilities, which may be used in a broad set of applications like question answering, information retrieval, information extraction, text summarization, and machine comprehension. The embodiments for the data entailment requirements 202 presented herein are exemplary in nature and should be treated as such.

The question data organizer 130 may obtain question entailment data 204 associated with the user question 216 from a plurality of data sources 206. The question entailment data 204 may be a dataset relevant to the user question 216. The question entailment data 204 may be a text document provided by a user to the system. The question entailment data 204 may be a text document stored in the system 110. In an example, the question entailment data 204 may include medical literature related to a medical product, medical records related to various patients suffering from a medical condition, pharmacovigilance agreements, various customer interactions, and product dossiers, various insurance policy documents, various insurance coverage information documents and the like. In accordance with various embodiments of the present disclosure, the question entailment data 204 may be in a portable document format (pdf), a doc/Docx format, a text format, a text from web scraper format, a rich text format (RTF), a Hypertext Markup Language (HTML) format. For the sake of brevity and technical clarity, other formats of the question entailment data 204 have not been mentioned herein, by should be clear to a person skilled in the art.

In an example, the plurality of data sources 206 may further include a natural language data directory. The natural language data directory may be a pre-existing text corpus stored in the system 110. The text corpus may refer to a large and structured set of texts that may be used to do a statistical analysis, hypothesis testing, checking occurrences or validating linguistic rules within a specific language territory. In an example, the text corpus may be the Stanford Natural Language Inference (SNLI) text corpus comprising a collection of labeled sentence pairs. For the sake of brevity and technical clarity, details about the SNLI have not been mentioned herein but should be clear to a person skilled in the art. The SNLI text corpus may be used to determine an entailment, a contradiction, and a piece of neutral information for a three-way task challenge on 570,000 labeled sentence pairs. In an example, the natural language data directory may be the Stanford Question Answering Dataset (SQuAD), which may be a reading comprehension dataset, consisting of questions posed by crowd workers on a set of articles, where the answer to every question is a segment of text, or span, from the corresponding reading passage, or the question might be unanswerable. In accordance with various embodiments of the present disclosure, the question entailment data 204 may include a text document relevant to the user question 216, and the natural language data directory.

The question data organizer 130 may implement an artificial intelligence component 218 to identify a word index 208 from the question entailment data 204. In accordance with various embodiments of the present disclosure, the artificial intelligence component 218 may include artificial intelligence techniques, for example, a Natural Language Processing (NLP) model. In an example, the NLP model may be developed using the Language Understanding Intelligent Service (LUIS). In an example, the NLP application may be development of a neural network with open information extraction systems like Knowledge graphs, and Never-Ending Language Learning (NELL), that may be used in mining the vast repository of the web and building a knowledge system, in the form of interrelated facts or a knowledge graph (described in detail by way of FIG. 4 and FIG. 5). This extracted knowledge may be used to provide reasoning and inference on the set of entities, their attributes, and their interrelations. The system 110 may deploy any of the NLP models not mentioned herein for identifying the word index 208 from the question entailment data 204. In accordance with various embodiments of the present disclosure, the NLP models may be developed in an AllenNLP™ environment. For the sake of brevity and technical clarity further details regarding various NLP models may be not be described herein, however, the same should be clear to a person skilled in the art.

The word index 208 may be including a plurality of words 210 being associated with the data entailment requirement 202. The artificial intelligence component 218 may map a set of words from the text document relevant to the user question 216 with the text corpus to identify the words index. The word index 208 may include the plurality of words 210, which may be present in the text document relevant to the user question 216 and may be present as labeled sentence pairs in the text corpus. In an example, the system may identify the word index 208 based on the SQuAD2.0 dataset. In an example, the text document relevant to the user question 216 may include " . . . We will pay You (or, if You request, the owner of the property) for loss of or damage as a result of fire, theft or accidental damage to Personal belongings which are in or on Your Car. We will NOT pay more than 500 in any one Complete Year of Insurance; We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates) . . . ". The question data organizer 130 may identify the word index 208 to include the plurality of words 210 such as "We", "will", "pay", "You", "(or,", "if", "You", "request,", "the", "owner", "of", "the", "property)", "for", "loss", "of", "or", "damage", "as", "a", "result", "of", "fire,", "theft", "or", "accidental", "damage", "to", "Personal", "belongings", "which", "are", "in", "or", "on", "Your", "Car.", "We", "will", "NOT", "pay", "more", "than", "500", "in", "any", "one", "Complete", "Year", "of", "Insurance;", "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates) . . . ". The question data organizer 130 may implement the artificial intelligence component 218 to map the word index 208 with the natural language data directory to derive a context of each of the plurality of words 210.

In accordance with various embodiments of the present disclosure, the question data organizer 130 may implement the artificial intelligence component 218 to assign a numeral symbol 240 to each of the words in the word index 208. For example, the word "We" may be assigned a numeral symbol "1", the word "will" may be assigned a numeral symbol "2", and so on until the word "certificates" may be assigned a numeral symbol "106".

The question data organizer 130 may implement the artificial intelligence component 218 to identify a question premise 212 from the user question 216. The question premise 212 may be comprising a first word data set 214 associated with the word index 208. In an example, the question premise 212 may be a text fragment segmented from the user question 216 by the question data organizer 130. The question premise 212 may be the text fragment from the user question 216, which may be identified by the artificial intelligence component 218 for generating a contextual answer insight. In an example, the question data organizer 130 may identify multiple question premise 212s for a given user question 216.

The first word data set 214 included in the question premise 212 may be a set of words that may form the text fragment, which may be identified as the question premise 212 by the artificial intelligence component 218. In an example, the question premise 212 identified from the user question 216 may be "What is the coverage for lost money?". The first word data set 214 for the question premise 212 may include words such as "What", "is", "the", "coverage", "for", "lost", "money", and "?".

The answer creator 140 may implement a first cognitive learning operation 220 to determine an answer premise 222 corresponding to the question premise 212. The first cognitive learning operation 220 may include implementing a Bi-Directional Attention Flow mechanism in a Deep Learning LSTM network to determine an answer start, and answer end and span information. The span information may refer to the numeral symbol 240 from the word index 208 corresponding to the answer start and the answer end. In an example, the AllenNLP may provide a BiDAF model that may be trained on the SQuAD dataset. An AllenNLP environment may be created to train and evaluate the BiDAF model. The SQuAD dataset may comprise, for example, 442 training sets and 48 dev sets. The dev set may be a validation set of data used to train the first cognitive learning operation 220 with an objective of finding and optimizing the best deep learning model to solve a given data entailment requirement 202. The training sets and the dev sets may be available as a JSON formatted data file. The first cognitive learning operation 220 may further include implementing various machine learning techniques such as word embedding algorithms like Glove, Keras embedding algorithm and the like. In an example, various machine learning algorithms such as TensorFlow, SpaCy, PyTorch and the like may be used for deriving a decomposable attention model. In an example, the decomposable attention model may be a recurrent Neural Network-based attention model. The Recurrent Neural Network (RNN) may be a type of Neural Network where the output from a previous step may be fed as input to a current step. The RNN may be deployed to predict the next word of a sentence, the previous words are required and hence there may be a need to remember the previous words. The system 110 may deploy various RNN based models as part of the first cognitive learning operation 220 for generation of the answer premise 222 corresponding to the question premise 212. In an example, the answer creator 140 may identify the answer premise 222 corresponding to each of the question premise 212s identified by the question data organizer 130 for a given set of question entailment data 204.

The answer premise 222 may indicate an inference associated with the user question 216. The inference may indicate an implication, which may be derived by the answer creator 140 for the user question 216. The answer creator 140 may implement the first cognitive learning operation 220 to map the first word data set 214 from the question premise 212 onto the context of the word index 208 to derive the context of the question premise 212. The context of the question premise 212 may be deployed to generate the corresponding answer premise 222 from within the word index 208. For example, as mentioned above, the word index 208 may include the plurality of words 210 such as "We", "will", "pay", "You", "(or,", "if", "You", "request,", "the", "owner", "of", "the", "property)", "for", "loss", "of", "or", "damage", "as", "a", "result", "of", "fire,", "theft", "or", "accidental", "damage", "to", "Personal", "belongings", "which", "are", "in", "or", "on", "Your", "Car.", "We", "will", "NOT", "pay", "more", "than", "500", "in", "any", "one", "Complete", "Year", "of", "Insurance;", "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates) . . . " and the question premise 212 may include the first word data set 214 such as "What", "is", "the", "coverage", "for", "lost", "money", and "?". The answer creator 140 may implement the first cognitive learning operation 220 to map the first word data set 214 from the question premise 212 onto the context of the word index 208 to derive the context of the question premise 212. The context of the question premise 212 may be deployed to generate the corresponding answer premise 222 from within the word index 208. For example, in the example mentioned above, the answer creator 140 may implement the first cognitive learning operation 220 to derive the context of the question premise 212 that may be related to "money" and "coverage for money". Therefore, the answer premise 222 may include the text fragment from the text document from the question entailment data 204 relevant to the "money" and "coverage for money" such as for example, "We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates)"

The answer premise 222 may be comprising a second-word data set 224. Each of the answer premise 222 may include the second-word data set 224. The second-word data set 224 may be associated with the word index 208. As mentioned above, the word index 208 may be derived based on a pre-existing text corpus with labeled sentence pairs and linguistic rules. The second-word data set 224 may be a set of words identified by the answer creator 140 from the word index 208 based on the context of the question premise 212 as identified by the first word data set 214 to convey an implication of the context of the question premise 212. For example, the answer premise 222 as identified in aforementioned example may be "We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates)" and the second-word data set 224 may include words such "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates".

In accordance with various embodiments of the present disclosure, the answer creator 140 may implement the first cognitive learning operation 220 to create an answer map 226 associated with the question premise 212 by mapping the second-word data set 224 with the first word data set 214. The answer creator 140 may map a set of words from the first word data set 214 with a set of words from the second-word data set 224 to derive a relationship between the words present in the question premise 212 with regard to words present in the answer premise 222. Such a relationship may be depicted as the answer map 226 (described in further detail by way of FIG. 4 and FIG. 5). In an example, the answer map 226 may facilitate the determination of the answer premise 222 from the question premise 212.

The modeler 150 may implement a second cognitive learning operation 228 to determine a subject component 230 from the second-word data set 224. The subject component 230 indicating a person, a place, a thing, or an idea associated with the question premise 212. In an example, the second cognitive learning operation 228 may be a deep learning neural network model to determine a natural language grammatical relationship. For example, the AllenNLP may provide a trained BiDAF pickled binary model for the task of Machine Reading Comprehension (MRC). The second cognitive learning operation 228 may include using semantic triples in applications in a semantic web environment. In an example, the second cognitive learning operation 228 may include the deployment of software such as Web Ontology Language (OWL) and Resource Description Framework (RDF). The semantic ontology software may have applications in the Semantic web. These may include data formats such as RDF, OWL, and SPARQL. The SPARQL may refer to an RDF query language that may be a semantic query language for databases. The SPARQL may be able to retrieve and manipulate data stored in Resource Description Framework (RDF) format. In addition to the knowledge base contained in the semantic triplets, the text document from the question entailment data 204 may provide the key constituents of a phrase grammar with the subject, verb and object pieces of a sentence. These may be used in a natural language grammar for clause and phrase construction. For example, projects like ClueWeb™, OpenIE™, and Wikipedia™ may provide a corpus of text data that may be used for ontological engineering. In an example, the second cognitive learning operation 228 may deploy parser extraction of triples techniques that may use a constituency parser. In an example, the second cognitive learning operation 228 may deploy software such as ClausIE™, OLLIE™ that may use a dependency parser to output a set of word triples. In an example, the second cognitive learning operation 228 may deploy a triple parser in the creation of a synthetic data set to input to the BiDAF model. Additionally, the AllenNLP environment may provide a deep learning framework using PyTorch™ and the GloVe™ word embeddings. The deep learning framework may support retraining of the BiDAF model using an input in form of a JavaScript Object Notation (JSON) format. In an example, the system 110 may deploy the synthesized dataset to retrain the AllenNLP BiDAF model. The retrained model file may be used for generating grammatical clauses and phrases for generating the answer for the user question 216.

As mentioned above, the modeler 150 may implement the second cognitive learning operation 228 to determine the subject component 230 from the second-word data set 224. The subject component 230 may be indicating a person, a place, a thing, or an idea associated with the question premise 212. For example, the second word dataset may include words such as "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates", and the user question 216 may be "What is the coverage for lost money?" Therefore, the modeler 150 may implement the second cognitive learning operation 228 to determine the subject component 230 as "We".

The modeler 150 may implement the second cognitive learning operation 228 to determine an object component 232 from the second-word data set 224. The object component 232 may be indicating a person, a place, a thing, and an idea associated with the subject component 230. For example, in case of the second word dataset mentioned above, the object component 232 may be identified to include words such as "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates".

The modeler 150 may implement a second cognitive learning operation 228 to determine a predicate component 234 from the second-word data set 224. The predicate component 234 may be indicating an action associated with the subject component 230. For example, in the case of the second word dataset mentioned above, the predicate component 234 may be identified to include words such as "not", and "pay".

The modeler 150 may implement a second cognitive learning operation 228 to generate an integrated answer 236 relevant to resolving the user question 216. The integrated answer 236 may be comprising the subject component 230, the object component 232, and the predicate component 234 associated with the question premise 212 concatenated to form an answer sentence 238. For example, the modeler 150 may generate the integrated answer 236 to be "We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates)". The integrated answer 236 may include the subject component 230 in form of "We". The integrated answer 236 may include the object component 232 in form of "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates". The integrated answer 236 may include the predicate component 234 in form of "not", and "pay". The modeler 150 may generate the integrated answer 236 by adding words such as "will" and other ancillary words. In an example, the modeler 150 may implement they may implement the second cognitive learning operation 228 to determine the set of ancillary words to be used for the generation of the integrated answer 236 from the word index 208. In an example, the semantic triples that may include the subject component 230, the object component 232, and the predicate component 234 may be extracted using an information extraction utility such as ClausIE or Parser Extraction. In an example, the sentences may be parsed using an Apache OpenNLP parser. A triples application jar may be used to extract tab-separated Subject-Verb-Object triples.

In accordance with various embodiments of the present disclosure, the modeler 150 may implement the second cognitive learning operation 228 to map the numeral symbol 240 for each of the words in the word index 208 with the first word data set 214 to determine a question premise 212 index. The question premise 212 index may include the numeral symbol 240 assigned to a word from the plurality of words 210 from the word index 208 mapped onto the corresponding word from the first word data set 214.

In accordance with various embodiments of the present disclosure, the modeler 150 may implement the second cognitive learning operation 228 to map the numeral symbol 240 for each of the words in the word index 208 with the second-word data set 224 to determine an answer premise 222 index. The answer premise 222 index may include the numeral symbol 240 assigned to a word from the plurality of words 210 from the word index 208 mapped onto the corresponding word from the second-word data set 224. For example, as mentioned above the word index 208 may include the plurality of words 210 such as "We", "will", "pay", "You", "(or,", "if", "You", "request,", "the", "owner", "of", "the", "property)", "for", "loss", "of", "or", "damage", "as", "a", "result", "of", "fire,", "theft", "or", "accidental", "damage", "to", "Personal", "belongings", "which", "are", "in", "or", "on", "Your", "Car.", "We", "will", "NOT", "pay", "more", "than", "500", "in", "any", "one", "Complete", "Year", "of", "Insurance;", "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates) . . . ". The question data organizer 130 may implement the artificial intelligence component 218 to assign the word "We" may be assigned a numeral symbol "52", the word "will" may be assigned a numeral symbol "53", the word "NOT" may be assigned a numeral symbol "53", and so on until the word "certificates" may be assigned a numeral symbol "106". As mentioned above the user question 216 for this example, may be "What is the coverage for lost money?" and the second-word data set 224 determined based on the answer premise 222 for aforementioned user question 216 determined by the answer creator 140 may include words such as "We", "will", "NOT", "pay", "for", "money", "or", "equivalent", "these", "include", "coins", "and", "bank", "notes", "used", "as", "legal", "tender,", "cheques,", "drafts,", "postal", "and", "money", "orders,", "prize", "bonds,", "travelers", "cheques,", "saving", "stamps", "and", "certificates,", "gift", "tokens,", "luncheon", "vouchers,", "phonecards,", "travel", "tickets,", "credit,", "debit", "charge,", "cheque", "or", "cash", "dispenser", "cards,", "stamps,", "tickets,", "documents,", "financial", "securities", "and", "share", "certificates". The answer premise 222 index would include the numeral symbol 240 assigned to each of the words from the plurality of words 210 that may be mapping onto the second-word data set 224. The answer premise 222 index may include the numeral symbol 240 numeral symbol 240 from the word index 208 corresponding to the answer start and the answer end. For example, answer premise 222 index may include the numeral symbol "52" for the word "We" and may include the numeral symbol "106" for the word "certificates". In an example, the answer premise 222 index may include the numeral symbol 240 from the word index 208 corresponding to the answer start. The answer premise 222 index may facilitate the generation of the span information for a contextual answer.

In accordance with various embodiments of the present disclosure, the modeler 150 may create a user question 216 library comprising the user question 216 and the answer sentence 238 associated with the user question 216. The modeler 150 may deploy the user question 216 library for generating an answer for a subsequent query.

In operation, a user may provide the user question 216 to the system 110. The system 110 may obtain the question entailment data 204 relevant to the user question 216 from the plurality of sources. The question entailment data 204 may include the text document relevant to the user question 216 and a natural language data directory. The system 110 may implement the artificial intelligence component 218 to generate the word index 208 from the text document relevant to the user question 216 based on the natural language data directory. The system 110 may deploy the word index 208 to derive the context of the text document relevant to the user question 216. The system 110 may assign the numeral symbol 240 to each of the plurality of words 210 present in the word index 208. The system 110 may implement the first cognitive learning operation 220 to generate the question premise 212 including the first word data set 214. The answer creator 140 may implement the first cognitive learning operation 220 to map the first word data set 214 from the question premise 212 onto the context of the word index 208 to derive the context of the question premise 212. The context of the question premise 212 may be deployed to generate the corresponding answer premise 222 from within the word index 208. The answer premise 222 may indicate an inference associated with the user question 216. The inference may indicate an implication, which may be derived by the answer creator 140 for the user question 216. The answer premise 222 may be comprising a second-word data set 224. Each of the answer premise 222 may include the second-word data set 224. The second-word data set 224 may be associated with the word index 208. In an example, the answer creator 140 may implement the first cognitive learning operation 220 to create an answer map 226 associated with the question premise 212 by mapping the second-word data set 224 with the first word data set 214. The answer map 226 may facilitate the determination of the answer premise 222 from the question premise 212. The modeler 150 may implement a second cognitive learning operation 228 to determine the subject component 230, the object component 232, and the predicate component 234 from the second-word data set 224. The modeler 150 may implement a second cognitive learning operation 228 to generate the integrated answer 236 relevant to resolving the user question 216. Therefore, the system 110 may deploy a top-down approach using a deep learning neural network to detect an answer string in the unstructured text passage since the answer premise 222 may be determined from within the word index 208. The system 110 may generate the answer sentence 238 replete with subject-object and predicate component 234s of a natural language. The system 110 may have applications in information retrieval, information extraction, question answering, and the like. In accordance with various embodiments of the present disclosure, the natural language may be any language that may present a method of human communication, either spoken or written, consisting of the use of words in a structured and conventional way.

In accordance with various embodiments of the present disclosure, the system 110 may be a neural network model to generate Natural Language Phrase (NLP) responses for applications in Question answering (QA) and reading comprehension from various models, for example, a Bi-Directional Attention Flow (BiDAF) deep learning model. The system may comprise a dataset containing phrase QA question-answer pairs that may be used to retrain a BiDAF model. Additionally, the dataset may contain an unstructured answer sentence 238 phrase comprising an encompassing semantic triple, which may include a contiguous subject phrase, a verb phrase and an object phrase in the answer value. The Phrase sentence QA may deploy a Deep Learning (ML) model. In an example, a trained BiDAF model may be used to determine an answer start and span information. In accordance with various embodiments of the present disclosure, the answer tokens sub-string determined by the answer start and span information may provide phrase answer response corresponding to input passage. The training data may be transformed and used to train a Deep Learning (ML) model thereby eliminating the need for a rule-based approach to QA. The system may provide a method for generation of SQuAD Phrase sentence (Triples) data to train a BiDAF model by transforming the passage, question-answer pairs in the data to include encompassing Triples phrase. For example, the system could provide contextual responses to user queries in a conversational agent format. In an example, the system 110 may deploy LSTM neural models for generating the integrated answer 236.

Accordingly, the system 110 and various embodiments thereof may provide an effective and efficient entailment analysis for a text document for the generation of answers for various user question 216 related to the text document.

Figure 3:
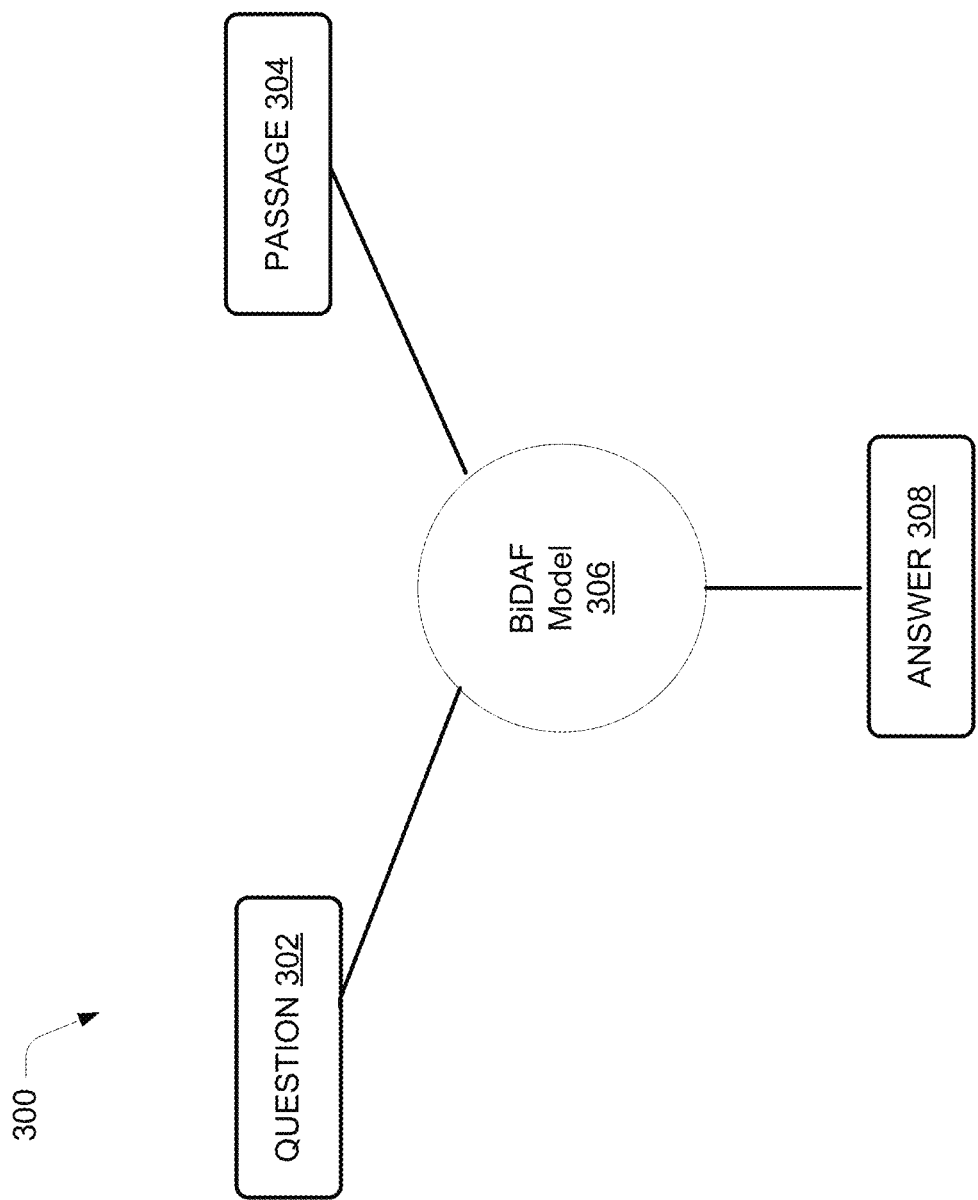
FIG. 3 illustrates a flow diagram for generating an answer to a question using a sentence phrasing system, according to an example embodiment of the present disclosure.

FIG. 3 illustrates a flow diagram 300 for generating an answer to a question using the sentence phrasing system 110, according to an example embodiment of the present disclosure. The components of the system 110 mentioned above by way of FIGS. 1-2 may be deployed for the purpose of FIG. 3 and the description for the same may not be repeated herein. The flow diagram 300 may include a question 302, and a passage 304. In an example, a user of the system 110 may provide the question 302, and the passage 304 as an input to a BiDAF model 306. The BiDAF model 306 may process the question 302 based on the passage 304 for generating an answer 308. In accordance with various embodiments of the present disclosure, the question 302 may be the user question 216, the passage 304 may form a part of the question entailment data 204, and the answer 308 may be the integrated answer 236 as mentioned above. In accordance with various embodiments of the present disclosure, the BiDAF model 306 may include the implementation of the artificial intelligence component 218, the first cognitive learning operation 220, and the second cognitive learning operation 228. In an example, the passage 304 may be "No completely reusable orbital launch system has ever been created. Two partially reusable launch systems were developed, the Space Shuttle and Falcon 9". The question 302 may be "How many partially reusable launch systems were developed?". The system 110 may implement the BiDAF model 306 to generate the answer 308 as "Two partially reusable launch systems were developed".

Figure 4:
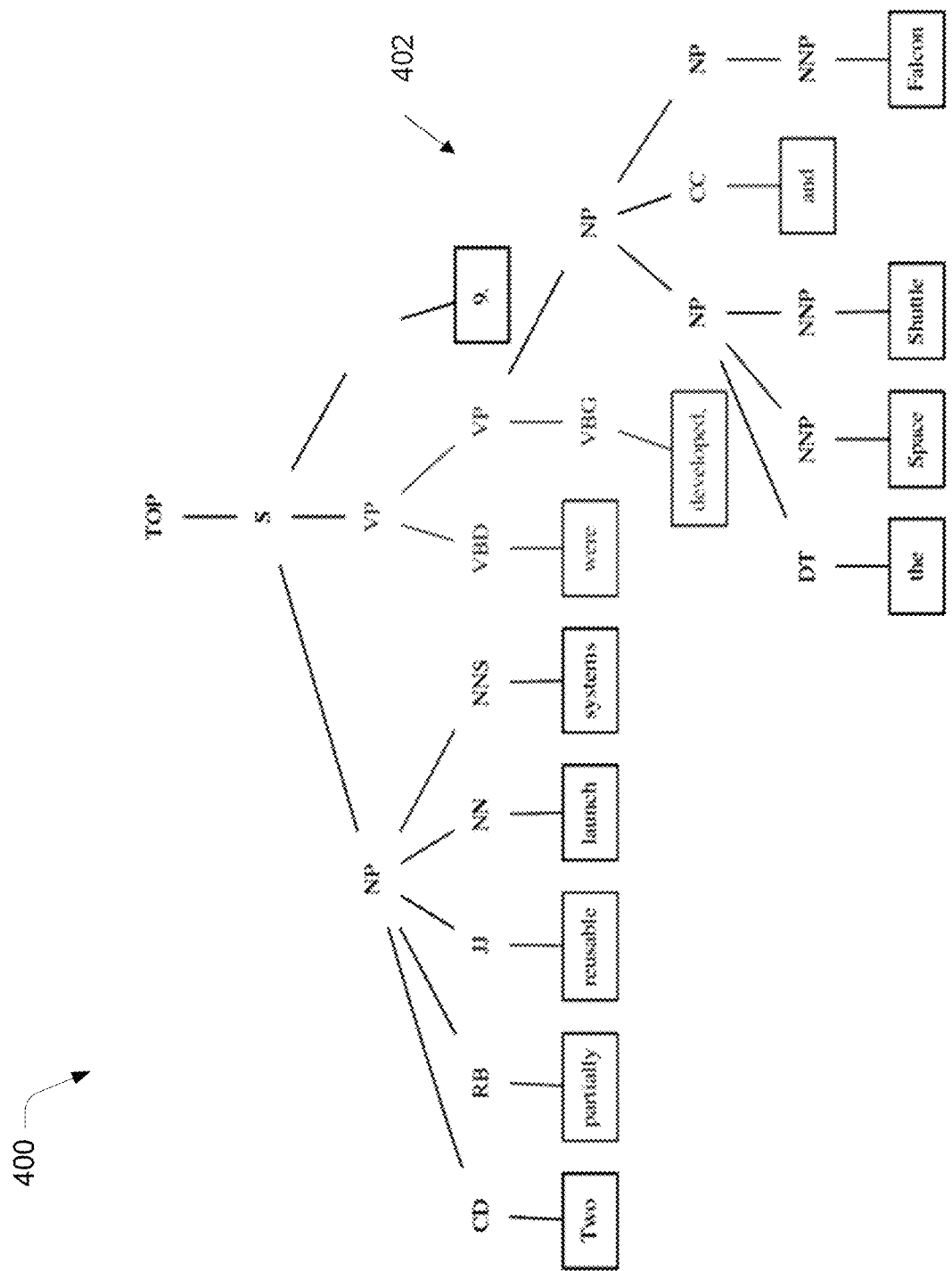
FIG. 4 illustrates a pictorial representation of a sentence constituency parse tree generated by deploying a sentence phrasing system, according to an example embodiment of the present disclosure.

FIG. 4 illustrates a pictorial representation 400 of a sentence constituency parse tree 402 generated by deploying the sentence phrasing system 110, according to an example embodiment of the present disclosure. The components of the system 110 mentioned above by way of FIGS. 1-3 may be deployed for the purpose of FIG. 4 and the description for the same may not be repeated herein. The sentence constituency parse tree 402 may illustrate the answer map 226. The sentence constituency parse tree 402 may represent a syntactic structure of a sentence according to a phrase structure grammar. For example, the sentence for the sentence constituency parse tree 402 may be "Two partially reusable launch systems were developed, the Space Shuttle and Falcon 9".

Figure 5:
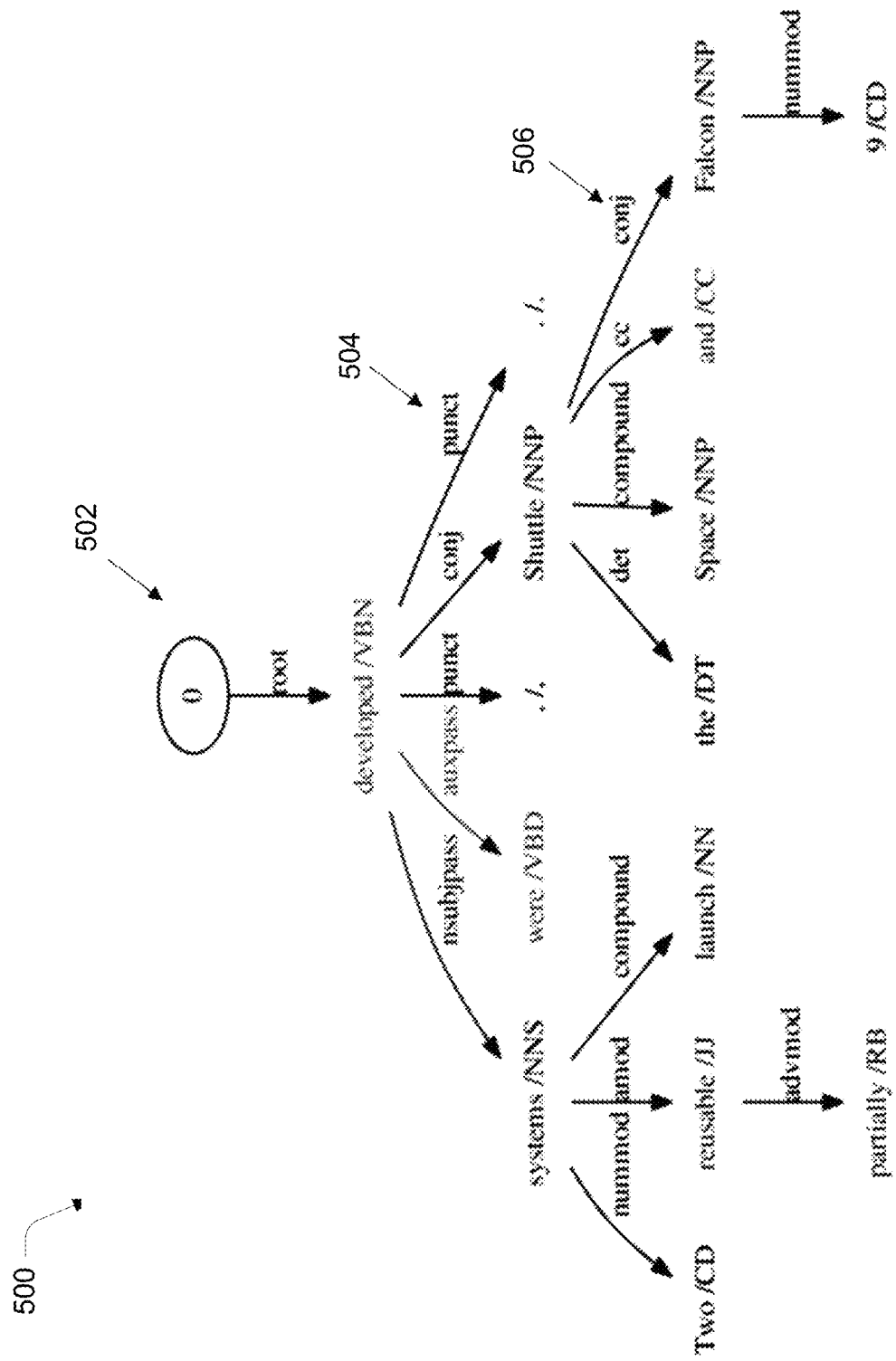
FIG. 5 illustrates a pictorial representation of a sentence dependency parse tree generated by deploying a sentence phrasing system, according to an example embodiment of the present disclosure.

FIG. 5 illustrates a pictorial representation 500 of a sentence dependency parse tree 502 generated by deploying the sentence phrasing system 110, according to an example embodiment of the present disclosure. The components of the system 110 mentioned above by way of FIGS. 1-4 may be deployed for the purpose of FIG. 5 and the description for the same may not be repeated herein. The sentence dependency parse tree 502 may illustrate the answer map 226. The sentence dependency parse tree 502 may represent a dependency parse of a sentence that may represent its grammatical structure and defines the relationships between "head" words and words, which modify those heads. For example, the sentence for the sentence dependency parse tree 502 may be "Two partially reusable launch systems were developed, the Space Shuttle and Falcon 9". The sentence dependency parse tree 502 may depict for example a punctuation 504, a conjunction 506 from the sentence mentioned above.

Figure 6:
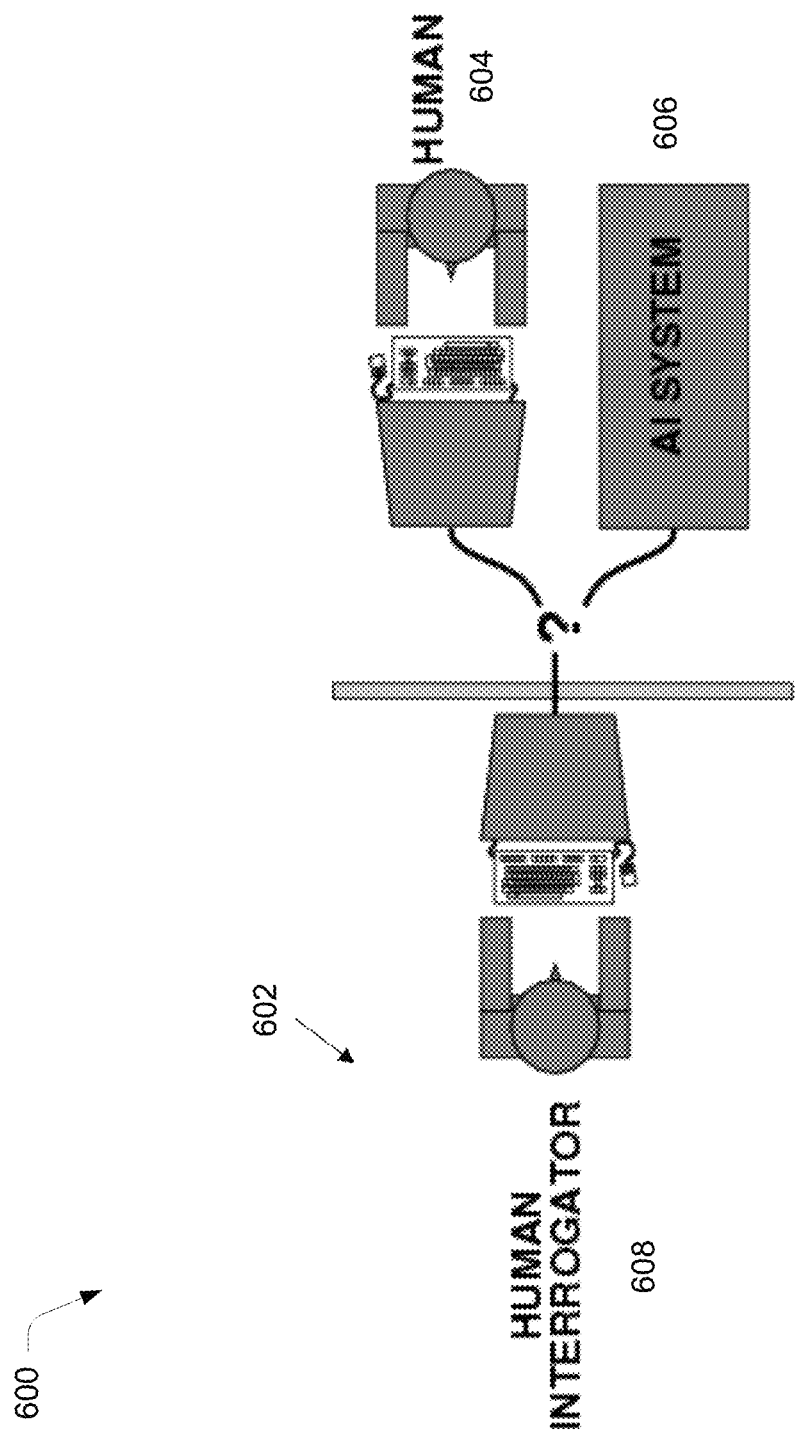
FIG. 6 illustrates a pictorial representation of a Turing test using a sentence phrasing system, according to an example embodiment of the present disclosure.

FIG. 6 illustrates a pictorial representation 600 of a Turing test 602 using the sentence phrasing system 110, according to an example embodiment of the present disclosure. The components of the system 110 mentioned above by way of FIGS. 1-5 may be deployed for the purpose of FIG. 6 and the description for the same may not be repeated herein. The Turing test 602 may include a human interrogator 608, a human 604, and an AI system 606. A Turing Test may be a method of inquiry in artificial intelligence (AI) for determining whether or not a computer is capable of thinking like a human being. The tasks present in a Turing test may be related to knowledge representation, reasoning, language/image understanding, and learning. The Turing test 602 may include comparing inferences dawn by the human 604 and the AI system 606 based on an input provided by the human interrogator 608. In an example, the AI system 606 may be the system 110 for the generation of contextual answers emulating natural language sentence construction based on an input and questions provided by the human interrogator 608.

Figure 7:
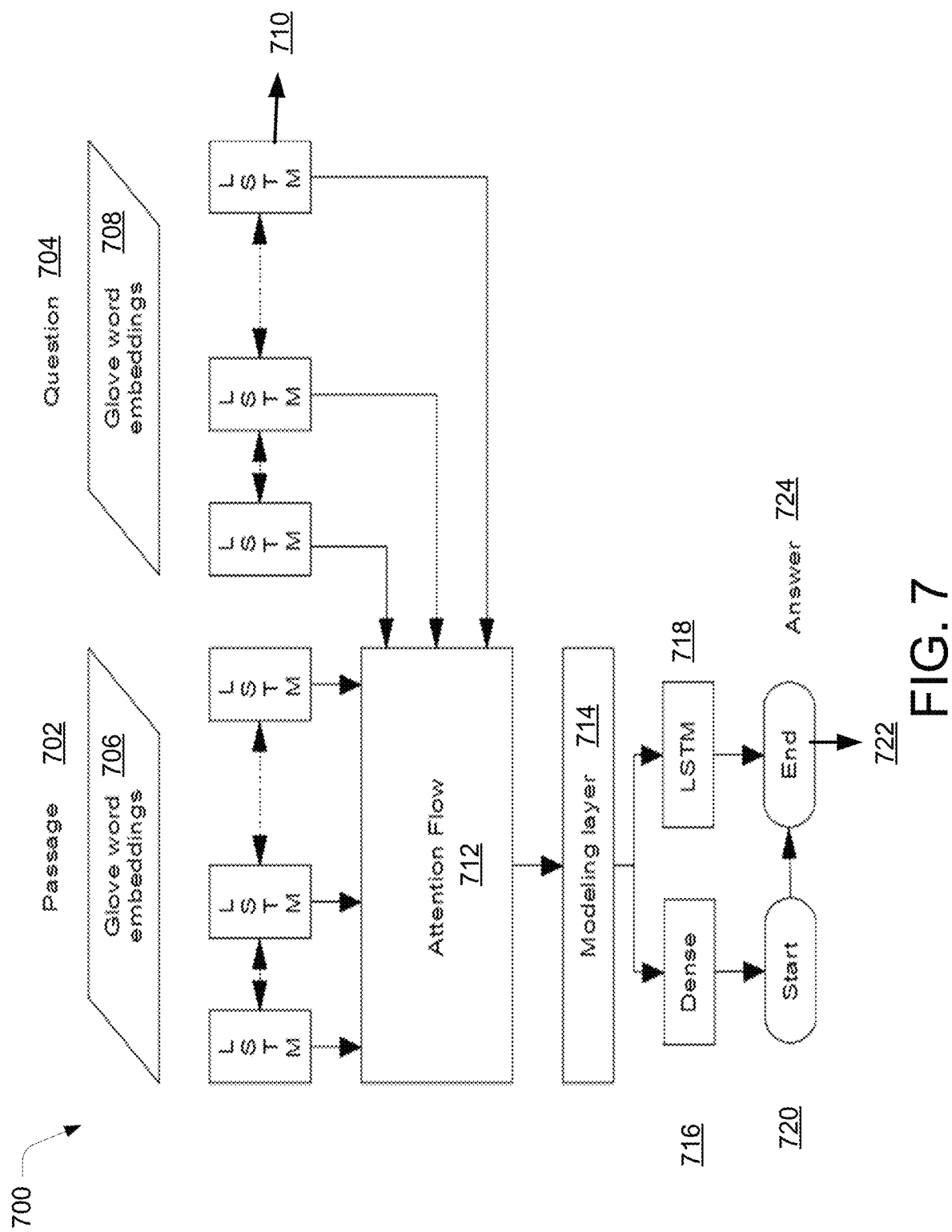
FIG. 7 illustrates a flow diagram for a Bi-Directional Attention Flow (BiDAF) deep learning model for deployment of a sentence phrasing system, according to an example embodiment of the present disclosure.

FIG. 7 illustrates a flow diagram 700 for a Bi-Directional Attention Flow (BiDAF) deep learning model for deployment of the sentence phrasing system 110, according to an example embodiment of the present disclosure. The components of the system 110 mentioned above by way of FIGS. 1-6 may be deployed for the purpose of FIG. 7 and the description for the same may not be repeated herein. The flow diagram 700 may illustrate the use of a Bi-Directional Attention Flow mechanism in a Deep Learning LSTM network to determine answer start and span information.

The flow diagram 700 may include a passage 702, and a question 704. The system 110 may obtain the passage 702 and generate a vector representation 706 for the words present in the passage 702. The system 110 may obtain the question 704 and generate a vector representation 708 for the words present in the question 704. In an example, the question 704 may be the user question 216, the passage 702 may form a part of the question entailment data 204. Therefore, the system 110 may generate vector representations for the words present in the word index 208 and the first word data set 214. In an example, the vector representations for the words present in the question 704, and the passage 702 may be generated using a GloVe™ algorithm that may be an unsupervised learning algorithm for obtaining vector representations for words.

The flow diagram 700 may apply an LSTM neural model 710 on the vector representation 706, and the vector representation 708. The LSTM neural model 710 may include sequence models that may be used in a variety of NLP tasks including machine translation and Natural Language Generation (NLG), and for Parser extraction for the extraction of semantic triples in an unstructured text document (as mentioned above). In an example, a synthesized dataset for natural language QnA using NLG may be deployed by the system 110. In an example, the synthesized dataset may include a 20,000-vocabulary subset of the SQuAD dataset. A set of semantic subject-predicate-object triples may be extracted in an unstructured passage text document. These may be extracted from the SQuAD dataset passage to construct the answer sentence 238 that may be ingested in the LSTM neural model 710. The synthesized data may be input to a combination of LSTM sequence models such as the LSTM neural model 710 to evaluate accuracy on the task on Question answering (illustrated by way FIGS. 14A-14I). The LSTM neural model 710 may lead to an attention layer 712. The attention layer 712 may present the output of the LSTM neural model 710 using a softmax function. The system 110 may further include a modeling layer 714. The modeling layer 714 may apply a dense layer 716 and an LSTM layer 718. The dense layer 716 may refer to a dense layer that may feed all outputs from the previous layer to all its neurons, and each neuron providing one output to the next layer. The LSTM layer 718 may refer to a single hidden LSTM layer that may be followed by a standard feedforward output layer. The dense layer 716 may lead to a start 720. The start 720 may refer to the answer start as mentioned above. The LSTM layer 718 may lead to an end 722. The start 720 and the end 722 may form an answer 724. In an example, the answer 724 may be the integrated answer 236. The start 720 and the end 722 may provide the span information.

Figure 8:
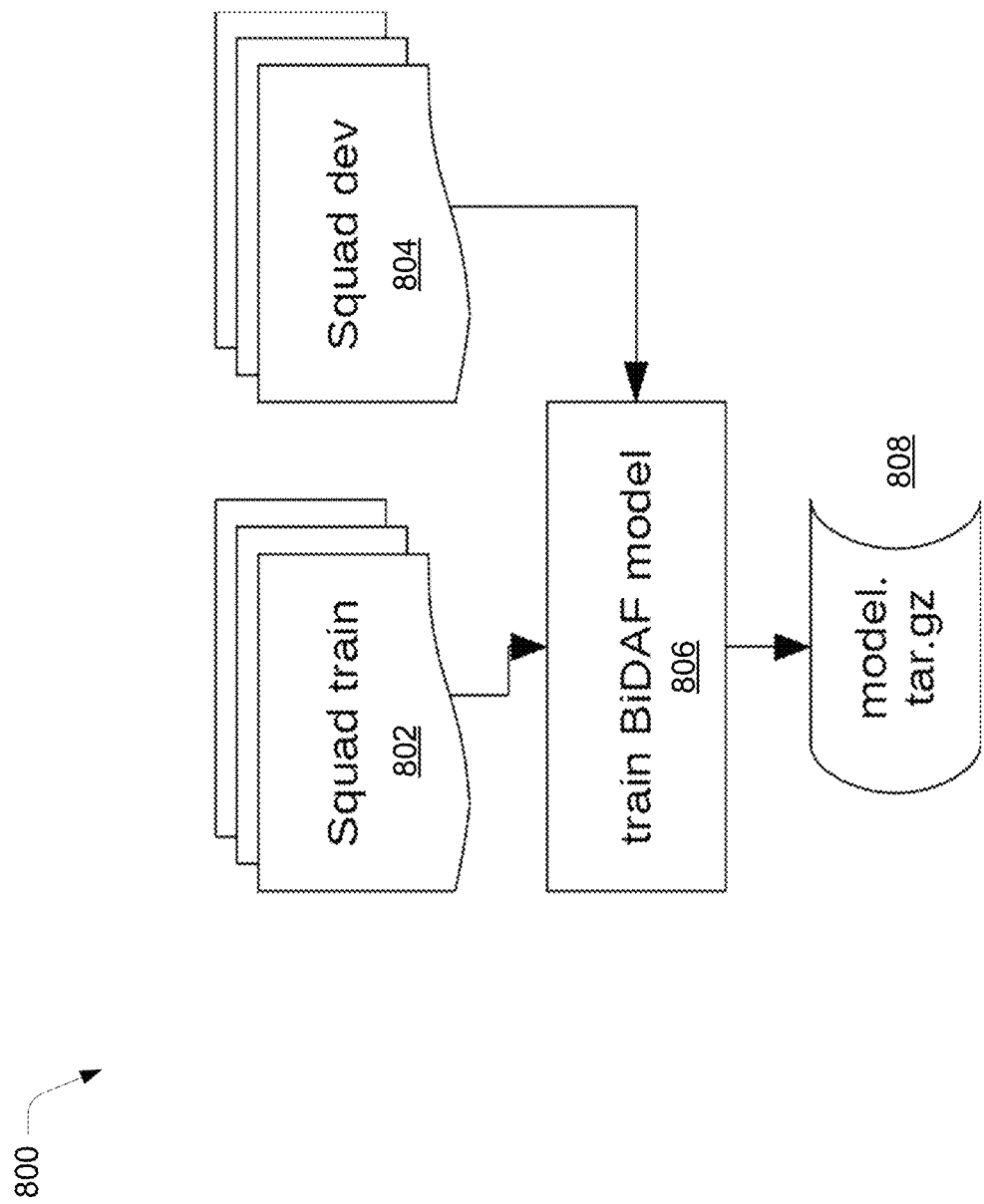
FIG. 8 illustrates a flow diagram for training a Bi-Directional Attention Flow (BiDAF) deep learning model for deployment of a sentence phrasing system, according to an example embodiment of the present disclosure.

FIG. 8 illustrates a flow diagram 800 for training a Bi-Directional Attention Flow (BiDAF) deep learning model for deployment of the sentence phrasing system 110, according to an example embodiment of the present disclosure. The components of the system 110 mentioned above by way of FIGS. 1-7 may be deployed for the purpose of FIG. 8 and the description for the same may not be repeated herein. The flow diagram 800 may include a SQuAD training dataset 802, and a SQuAD dev set 804. The SQuAD training dataset 802 may comprise, for example, 442 training sets and the SQuAD dev set 804 may comprise 48 dev sets. The dev set may be a validation set of data used to train the first cognitive learning operation 220 with an objective of finding and optimizing the best deep learning model to solve a given data entailment requirement 202. The Squad training dataset 802 and the SQuAD dev set 804 may be available as a JSON formatted data file. The SQuAD training dataset 802 and the SQuAD dev set 804 may be used to perform a training 806. The training 806 may include training a BiDAF model for generating the integrated answer 236. The system 110 may execute a function "squad-train.json" for training the BiDAF model using the Squad training dataset 802. The system 110 may execute a function "squad-dev.json" for training the BiDAF model using the SQuAD dev set 804. The system 110 may execute a function 808 after the training 806. The function 808 may be "model tar.gz".

Figure 9:
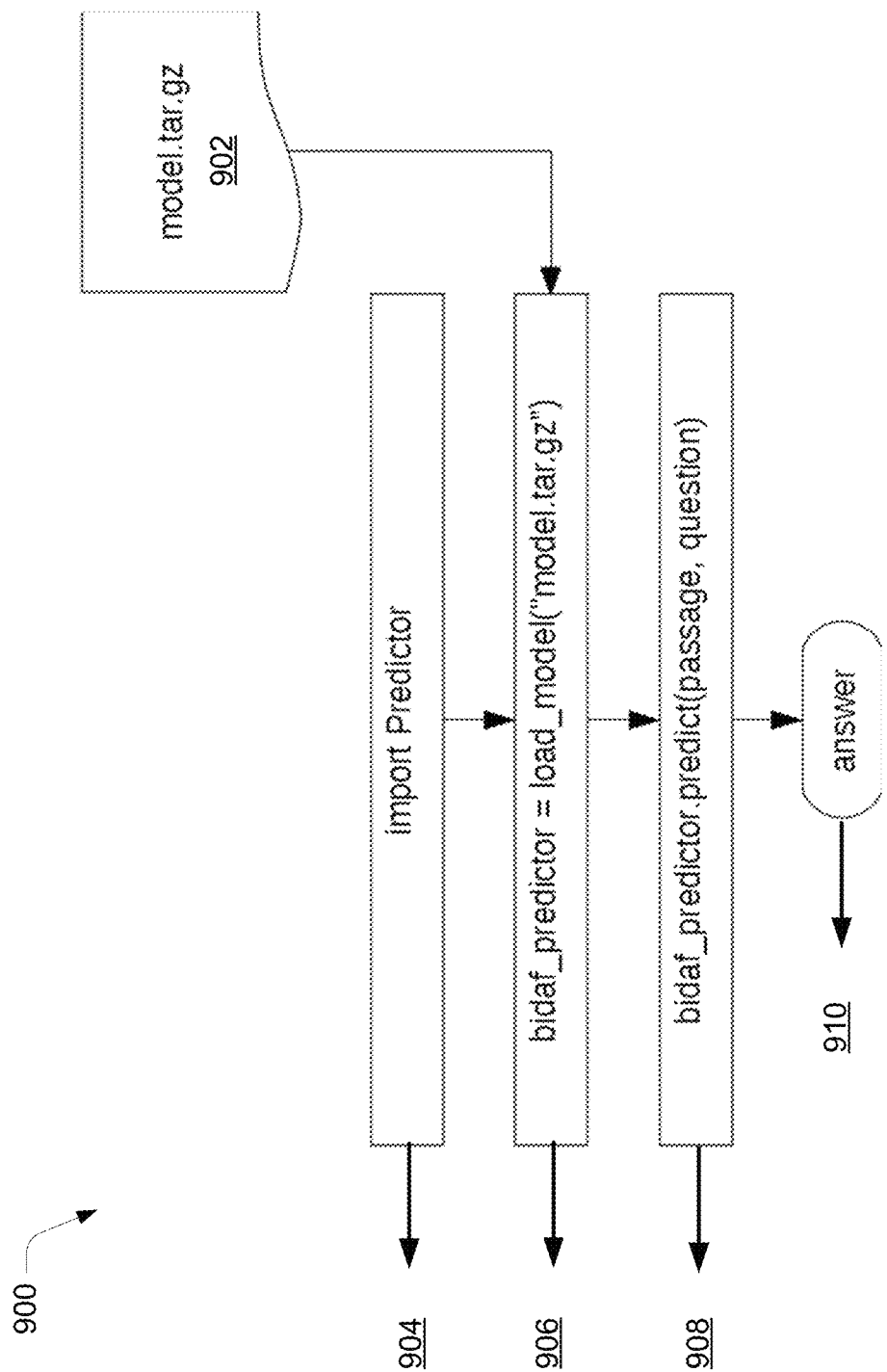
FIG. 9 illustrates a flow diagram for generating an answer prediction using a Bi-Directional Attention Flow (BiDAF) deep learning model by deploying a sentence phrasing system, according to an example embodiment of the present disclosure.

FIG. 9 illustrates a flow diagram 900 for generating an answer prediction using a Bi-Directional Attention Flow (BiDAF) deep learning model by deploying the sentence phrasing system 110, according to an example embodiment of the present disclosure. The components of the system 110 mentioned above by way of FIGS. 1-8 may be deployed for the purpose of FIG. 9 and the description for the same may not be repeated herein. The flow diagram 900 may include a function 902. The function 902 may be the function 808. The function 902 may be "model tar.gz". The system 110 may execute an import 904. The import 904 may include importing a predictor model. The system 110 may execute the function 902 onto the predictor model from the import 904 to generate a function 906. The function 906 may include the function "bidaf_predictor=load_model("model.tar.gz"). The system 110 may execute a function 908 after the function 906. The function 908 may include "bidaf_predictor.predict(passage, question). The system 110 may generate an answer 910 through the function 908. The answer 910 may be the integrated answer 236. FIG. 8 and FIG. 9 illustrate a summary of functions executed by the system 110 for generating contextual answers to the user question 216 based on the question entailment data 204 and using a training dataset and a validation dataset.

Figure 10:
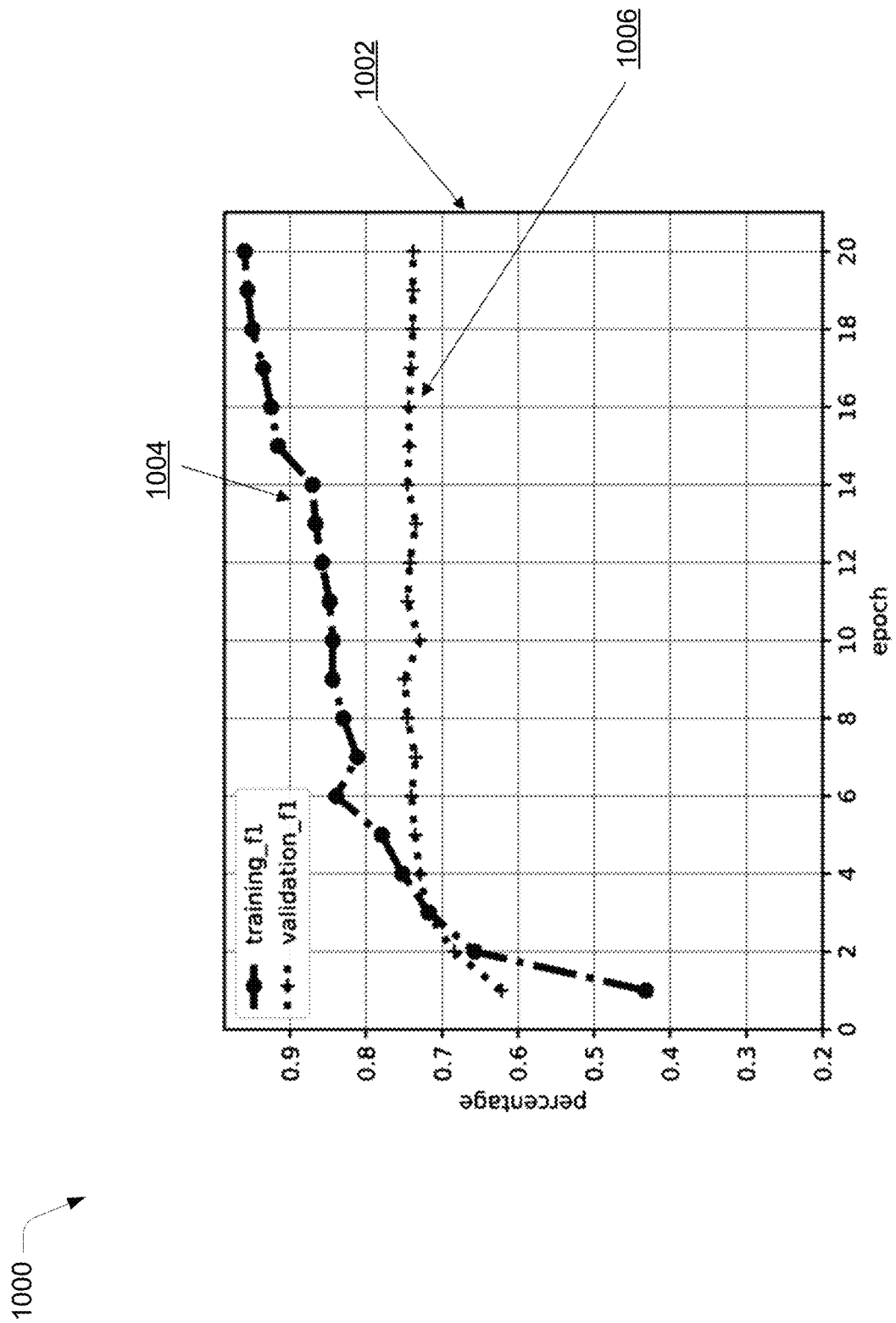
FIG. 10 illustrates a pictorial representation for training a deep learning model for the deployment of a sentence phrasing system, according to an example embodiment of the present disclosure.

FIG. 10 illustrates a pictorial representation 1000 for training a deep learning model for the deployment of the sentence phrasing system 110, according to an example embodiment of the present disclosure. The components of the system 110 mentioned above by way of FIGS. 1-9 may be deployed for the purpose of FIG. 10 and the description for the same may not be repeated herein. The SQuAD dataset may consist of 100,000+ question-answer pairs containing a passage, question and answer start and span information. The dataset may deploy phrasal sentences from Wikipedia™ articles with crowdsourced question-answer pairs. The system 110 may include deep learning models for machine-reading comprehension to identify the semantic phrase strings corresponding to the answer in a given passage. Additionally, SQuAD may use two metrics F1 and an exact match (EM) to benchmark the dataset against a set of models. The EM may be the Exact Match metric that may measure the percentage of predictions matching the answers set. The F1 score may be used to measure the average accuracy from the precision and recall metrics. The baseline models for the SQuAD v1.1 dataset using a logistic regression model may have achieved an F1 score of 51% on the test set compared to a human F1 score of 86.8%. The pictorial representation 1000 illustrates the values of F1 for the trained epochs with respect to the Squad training dataset 802 and the SQuAD dev set 804. The term "epoch" may refer to one cycle through the full training dataset. One epoch may signify that each sample in the training dataset may have had an opportunity to update the internal model parameters. An epoch may be comprised of one or more batches.

Figure 11:
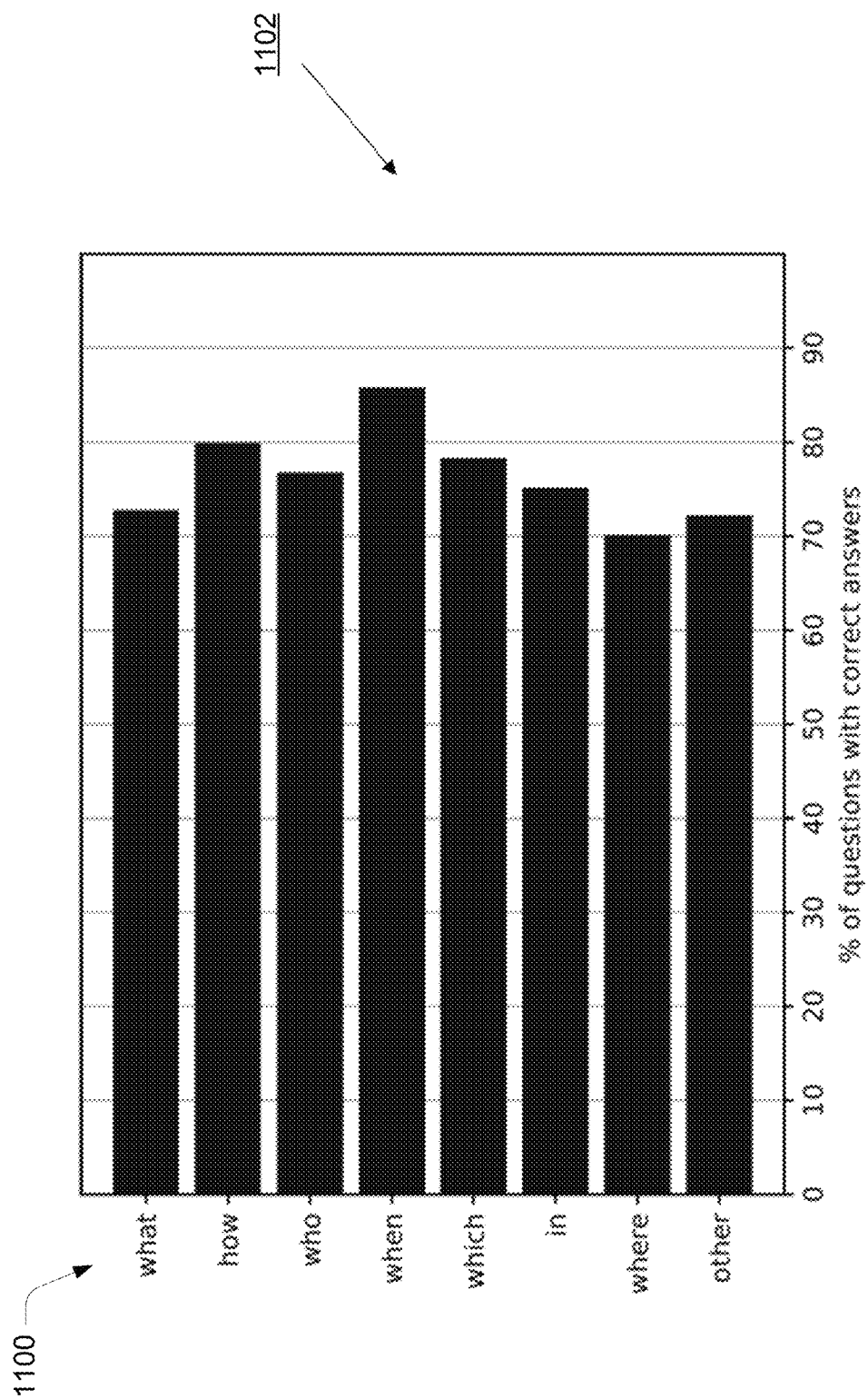
FIG. 11 illustrates a pictorial representation illustrating results of training of a deep learning model for deployment of a sentence phrasing system, according to an example embodiment of the present disclosure.

FIG. 11 illustrates a pictorial representation 1100 illustrating results of training of a deep learning model for deployment of the sentence phrasing system 110, according to an example embodiment of the present disclosure. The components of the system 110 mentioned above by way of FIGS. 1-10 may be deployed for the purpose of FIG. 11 and the description for the same may not be repeated herein. The pictorial representation 1100 may illustrate top questions in each of the categories of "Who", "What", "When" first word questions in the SQuAD dev set 804 and their accuracies. The trained model deployed by the system 110 may be able to respond with >75% accuracy on a large number of the questions. The pictorial representation 1100 illustrates correctly answered questions by the deep learning model deployed by the system 110 by the most frequent first words in question.

Figure 12:
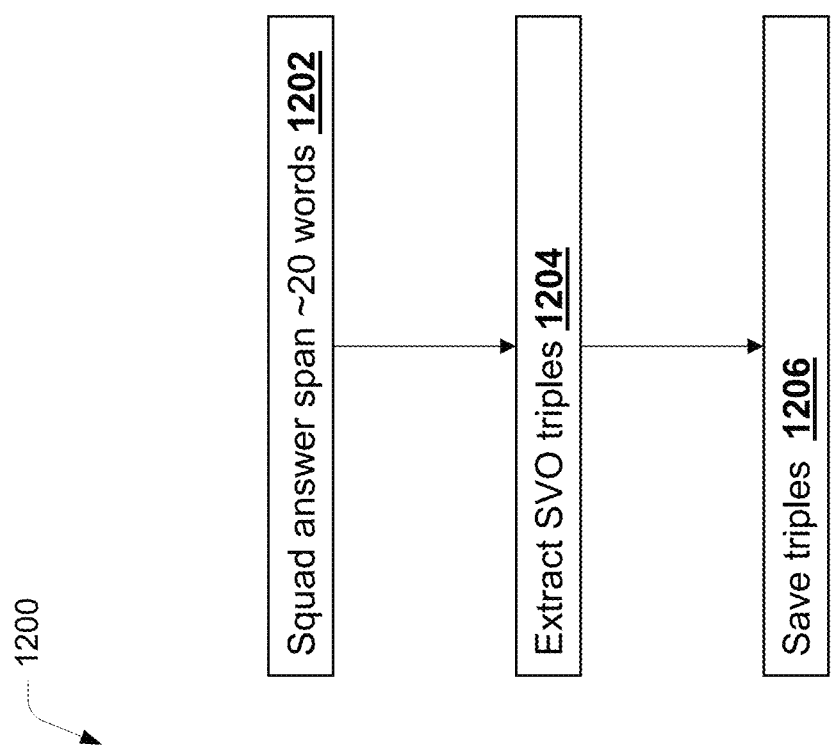
FIG. 12 illustrates a flow diagram for generating an answer using a sentence phrasing system, according to an example embodiment of the present disclosure.

FIG. 12 illustrates a flow diagram 1200 for generating an answer using the sentence phrasing system 110, according to an example embodiment of the present disclosure. The components of the system 110 mentioned above by way of FIGS. 1-11 may be deployed for the purpose of FIG. 12 and the description for the same may not be repeated herein. The flow diagram 1200 illustrates the extraction of Subject-Verb-Object (S-V-O) triples in the SQuAD answer span. The SQuAD v2.0 dataset may be read to initialize the JSON dataset. These may be subsequently collated with the triples input dataset to form a new squad-train.json to be used for training the BiDAF model. The flow diagram 1200 may include an identification 1202. The identification 1202 may be from the answers provided to various questions in the SQuAD v2.0 dataset. In an example, each answer span may be about 20 words. The system 110 may execute an extraction 1204 on the answers obtained by the identification 1202. The extraction 1204 may extract the Subject-Verb-Object (S-V-O) triples from each answer span. The system 110 may execute a storage 1206. The storage 1206 may save the Subject-Verb-Object (S-V-O) triples extracted by the extraction 1204.

Figure 13A:
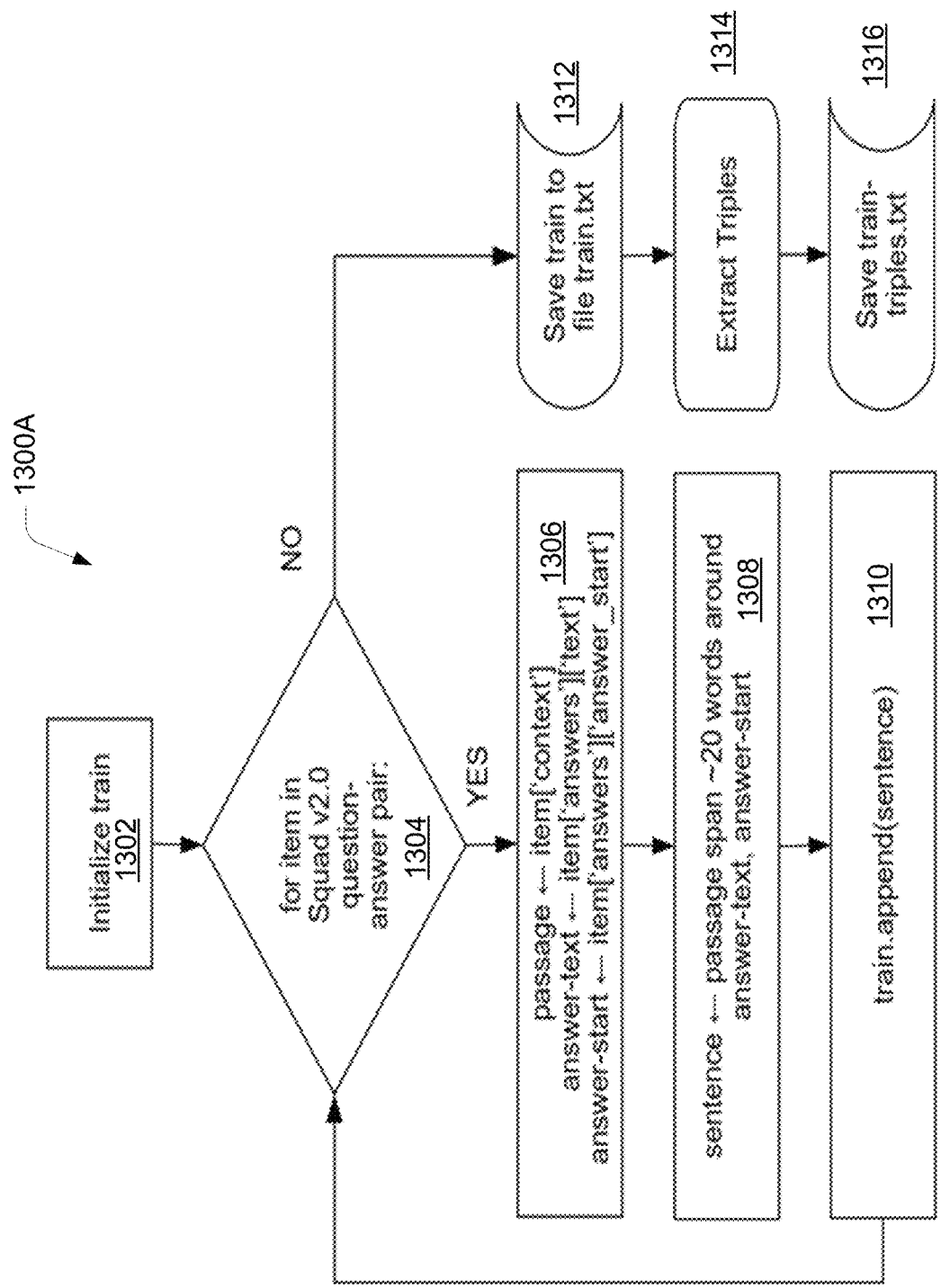
FIGS. 13A and 13B illustrate a flow diagram for creating a set of semantic triples answer spans using a sentence phrasing system, according to an example embodiment of the present disclosure.
Figure 13B:
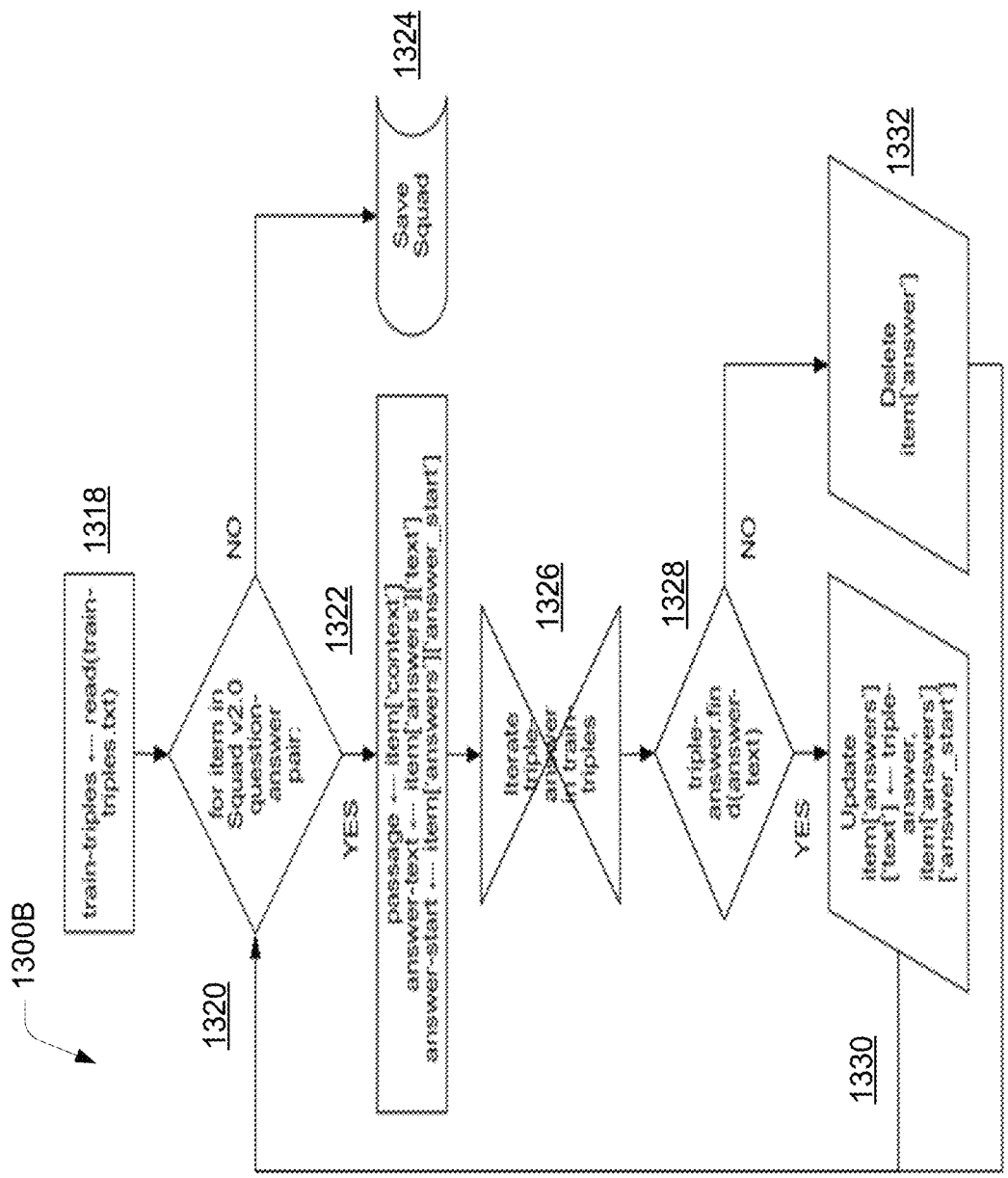

FIGS. 13A and 13B illustrate a flow diagram 1300A and 1300B for creating a set of semantic triples answer spans using the sentence phrasing system 110, according to an example embodiment of the present disclosure. The components of the system 110 mentioned above by way of FIGS. 1-12 may be deployed for the purpose of FIG. 13A and FIG. 13B and the description for the same may not be repeated herein. The flow diagram 1300A may include an initialization 1302. The initialization 1302 may initiate the deep learning model deployed by the system 110. The initialization 1302 may lead to a check 1304. The check 1304 may include checking if the user question 216 and the text document relevant to the user question 216 may be processed using the question-answer pairs in the SQuAD v2.0 dataset. The system 110 may execute a function 1306 when the check 1304 may be positive. The function 1306 may include "passage←item['context']"answer-text←item['answers']['text']", answer-start←item['answers']['answer-start']". The function 1306 may be followed by a function 1308. The function 1308 may include sentence←passage span~20 words around answer-text, answer-start. The function 1308 may be followed by a function 1310. The function 1310 may be train.append(sentence). The system 110 may append the output from the function 1310 into the question-answer pairs in the SQuAD v2.0 dataset. In an example, wherein the check 1304 may be negative, the system may execute a function 1312. The function 1312 may include "save train to file train.txt". The function 1312 may be followed by a function 1314. The function 1314 may perform an extraction of the Subject-Verb-Object (S-V-O) triples similar to the extraction 1204 explained above. The function 1314 may be followed by a function 1316. The function 1316 may save the Subject-Verb-Object (S-V-O) triples extracted by the function 1314. The function 1316 may be "save train-triples.txt".

The function 1316 may be followed by a function 1318 illustrated in the flow diagram 1300B. The function 1318 may include reading the output from the function 1316 in the form of saved Subject-Verb-Object (S-V-O) triples by executing a function "train-triples←read (train-triples.txt). The function 1318 may lead to a check 1320. The check 1320 may include checking if the user question 216 and the text document relevant to the user question 216 may be processed using the question-answer pairs in the updated SQuAD v2.0 dataset. The system 110 may execute a function 1324 when the check 1320 may be negative. The function 1324 may be "save squad". The system 110 may execute a function 1322 when the check 1320 may be positive. The function 1322 may include "passage←item ['context]", "answer-text item['answers']['text']", answer-start←item['answers']['answer-start']". The function 1322 may be followed by a function 1326. The function 1326 may be "iterate triple answer in train-triples". The function 1326 may be followed by a check 1328. The check 1328 may include executing a function "triple-answer.find(answer-text)". The system 110 may execute a function 1330 if the check 1328 may be positive. The function 1330 may include "Update item['answers']['text'] ←triple-answer, item['answers']['answer start']". In an example, wherein the check 1328 may be negative, the system 110 may execute a function 1332. The function 1332 may include "Delete item['answer']". The system 110 may update the output from the function 1330 and the function 1332 into the check 1320.

Figure 14A:
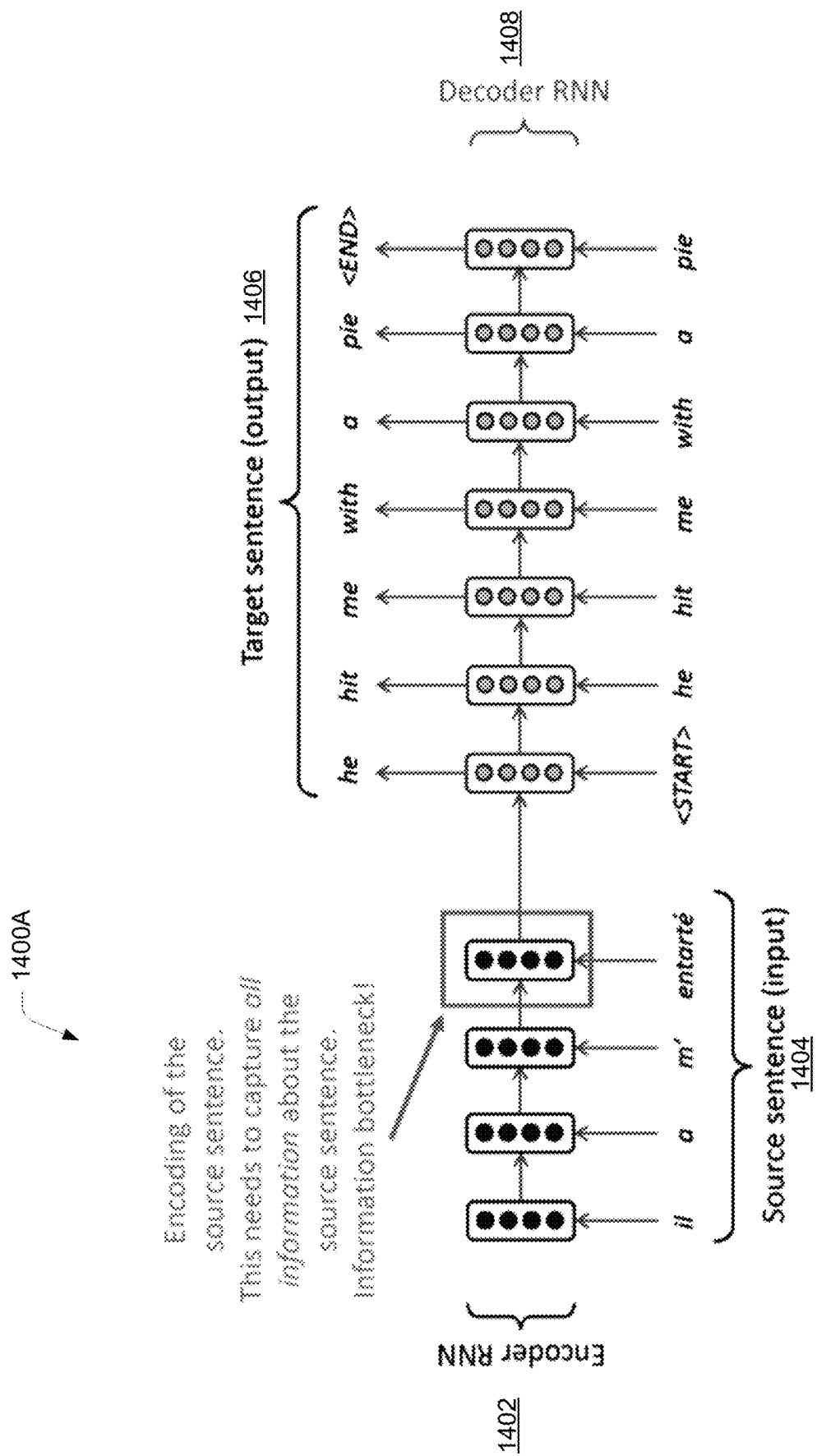
FIG. 14A illustrates a pictorial representation of a bottleneck problem for a deep learning model for deployment of a sentence phrasing system, according to an example embodiment of the present disclosure.

FIG. 14A illustrates a pictorial representation 1400A of a bottleneck problem for a deep learning model for deployment of the sentence phrasing system 110, according to an example embodiment of the present disclosure. The components of the system 110 mentioned above by way of FIGS. 1-13B may be deployed for the purpose of FIG. 14A and the description for the same may not be repeated herein. The pictorial representation 1400A may include an encoder RNN 1402, an input source sentence 1404, an output target sentence 1406, and a decoder RNN 1408. The encoder RNN 1402 may encode the input source sentence 1404 for capturing all information provided therein. The decoder RNN 1408 may extract the information and generate the output target sentence 1406.

Figure 14B:
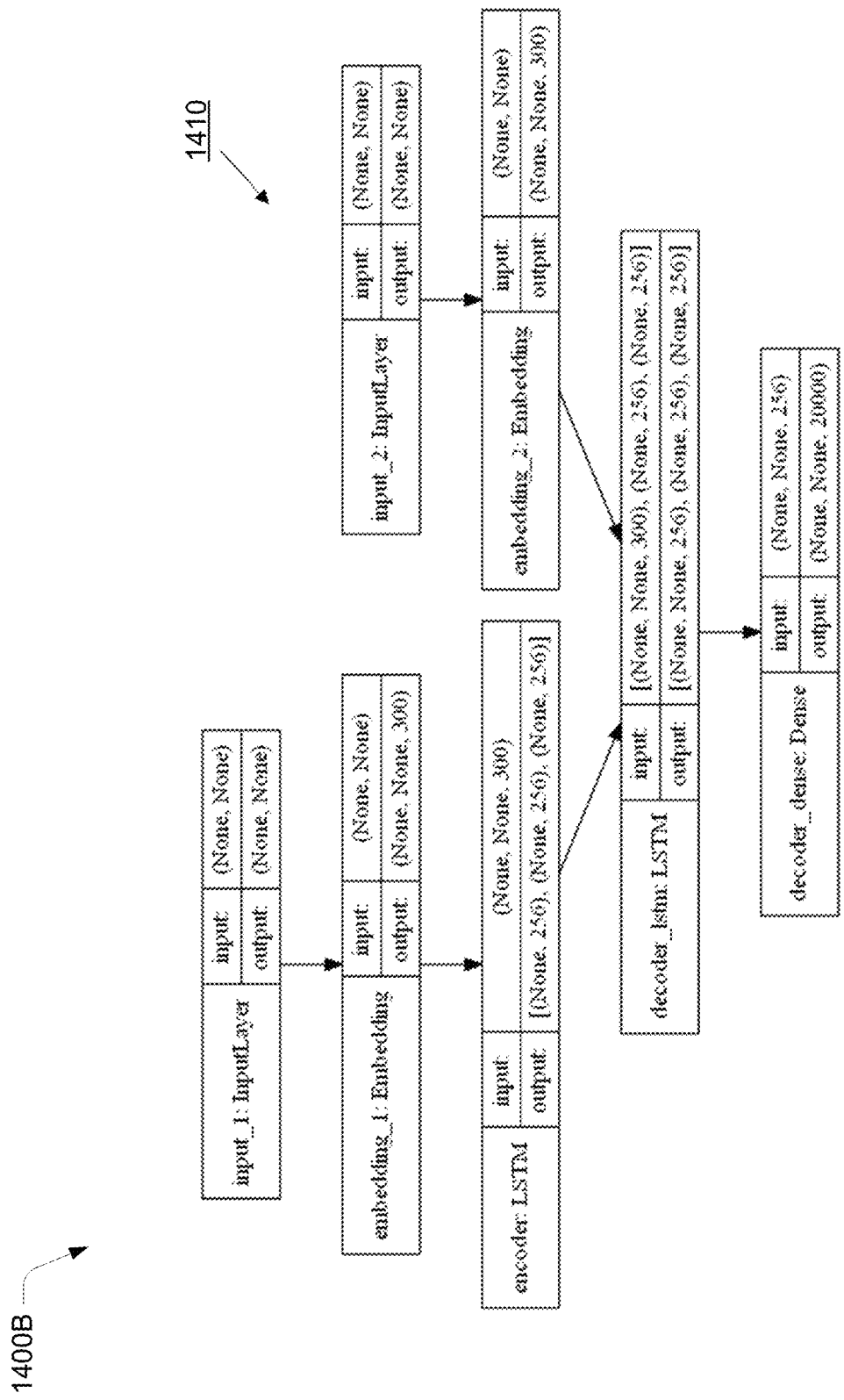
FIG. 14B illustrates a pictorial representation of a Long short-term memory (LSTM) sequence-to-sequence model for deployment of a sentence phrasing system, according to an example embodiment of the present disclosure.

FIG. 14B illustrates a pictorial representation 1400B of a Long short-term memory (LSTM) sequence-to-sequence model 1410 for deployment of the sentence phrasing system 110, according to an example embodiment of the present disclosure. The components of the system 110 mentioned above by way of FIGS. 1-14A may be deployed for the purpose of FIG. 14B and the description for the same may not be repeated herein. The synthesized dataset mentioned above for natural language questions and answering using NLG may be deployed by the system 110. In an example, the synthesized dataset may include a 20,000-vocabulary subset of the SQuAD dataset. A set of semantic subject-predicate-object triples may be extracted in an unstructured passage text document. These may be extracted from the SQuAD dataset passage to construct the answer sentence 238 that may be ingested in an LSTM model, for example, the LSTM neural model 710. The synthesized data may be input to a combination of LSTM sequence models such as the LSTM neural model 710 to evaluate accuracy on the task on Question answering.

Figure 14C:
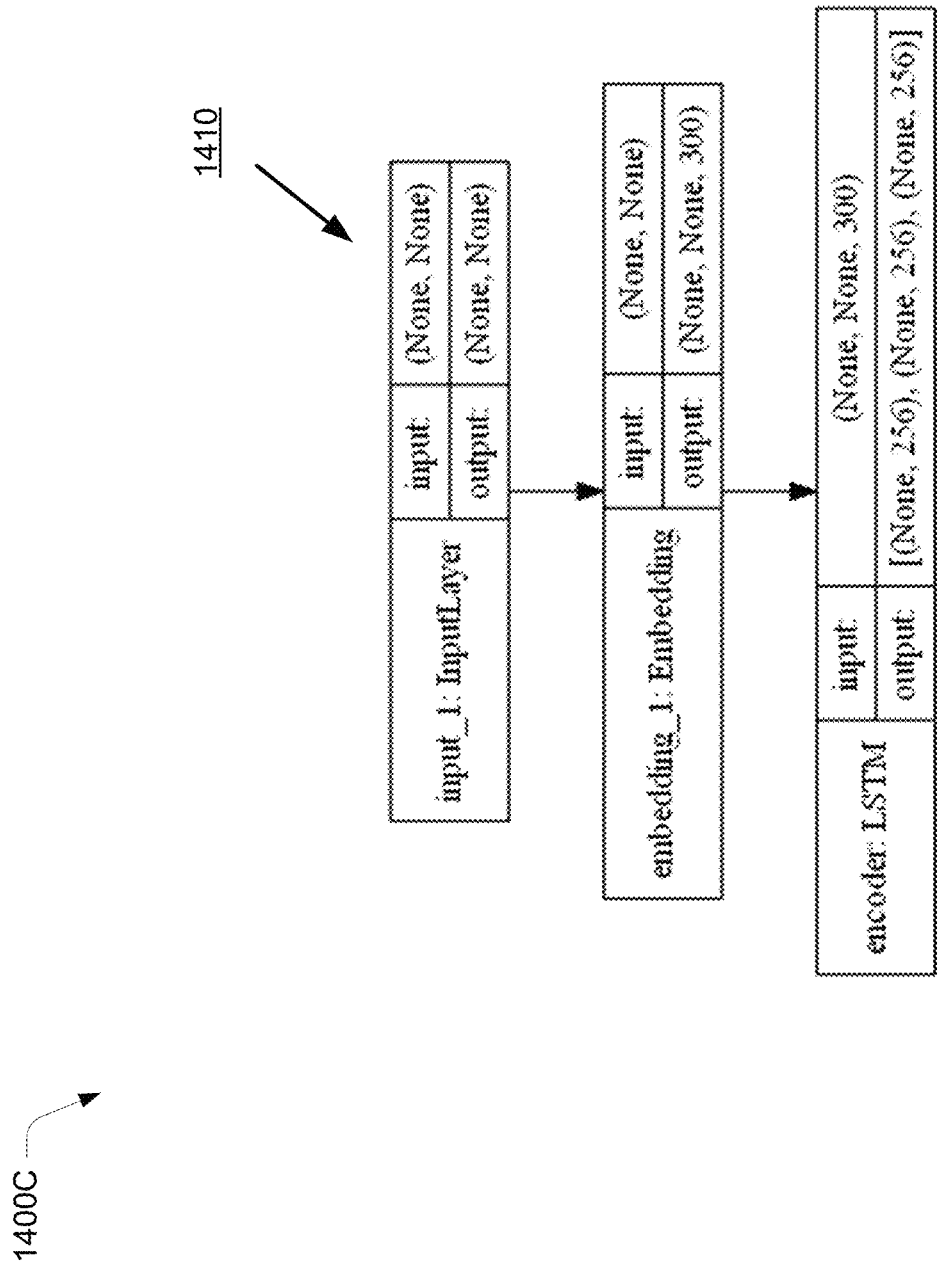
FIG. 14C illustrates a pictorial representation of an encoder model for deployment of a sentence phrasing system, according to an example embodiment of the present disclosure.

FIG. 14C illustrates a pictorial representation 1400C of an encoder model 1412 for deployment of the sentence phrasing system 110, according to an example embodiment of the present disclosure. The components of the system 110 mentioned above by way of FIGS. 1-14B may be deployed for the purpose of FIG. 14C and the description for the same may not be repeated herein. The pictorial representation 1400C may illustrate an encoder model for the Long short-term memory (LSTM) sequence-to-sequence model from the FIG. 14B.

Figure 14D:
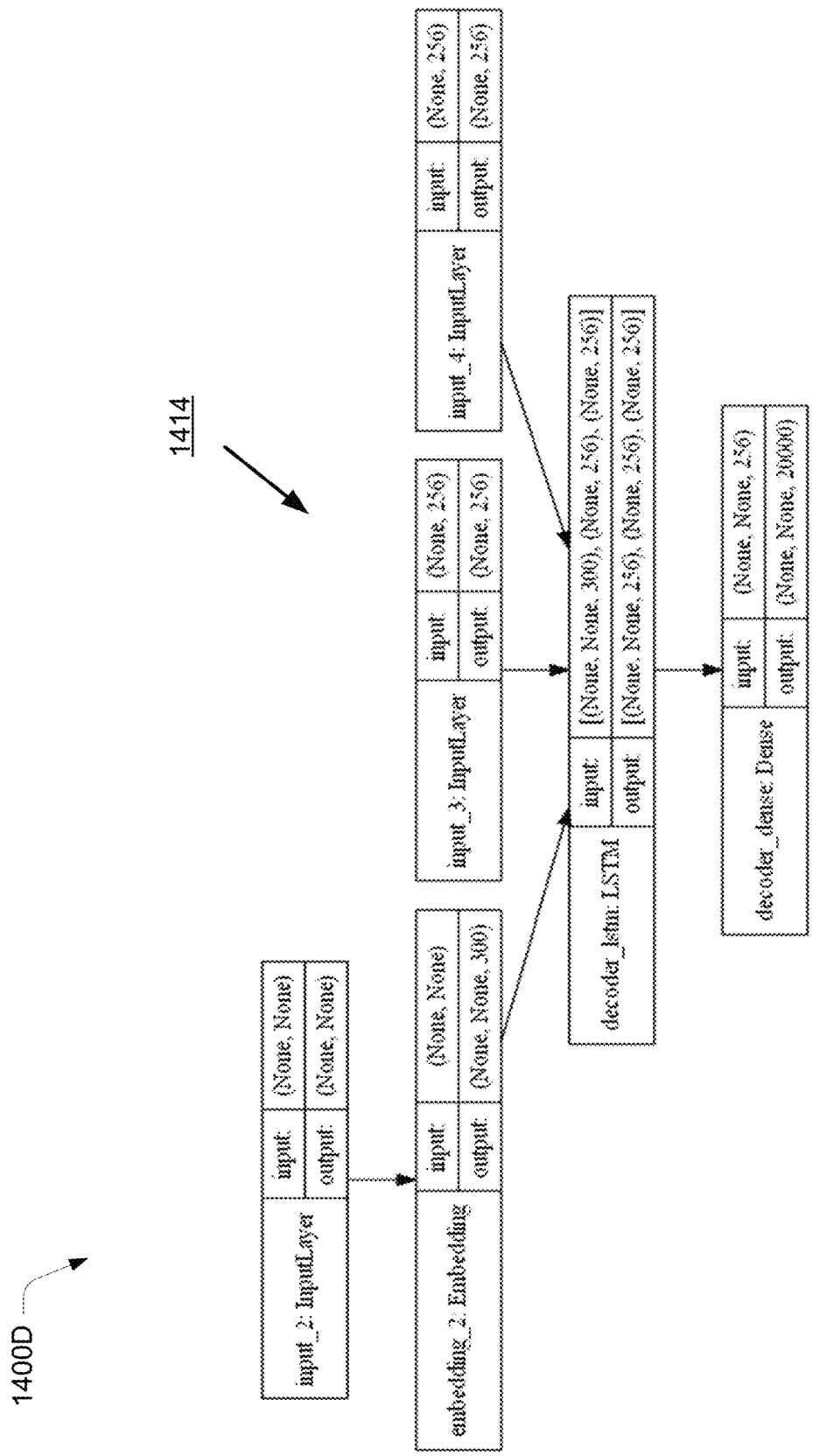
FIG. 14D illustrates a pictorial representation of a decoder model for deployment of a sentence phrasing system, according to an example embodiment of the present disclosure.

FIG. 14D illustrates a pictorial representation 1400D of a decoder model 1414 for deployment of the sentence phrasing system 110, according to an example embodiment of the present disclosure. The components of the system 110 mentioned above by way of FIGS. 1-14C may be deployed for the purpose of FIG. 14D and the description for the same may not be repeated herein. The pictorial representation 1400C may illustrate a decoder model for the Long short-term memory (LSTM) sequence-to-sequence model from the FIG. 14B.

Figure 14E:
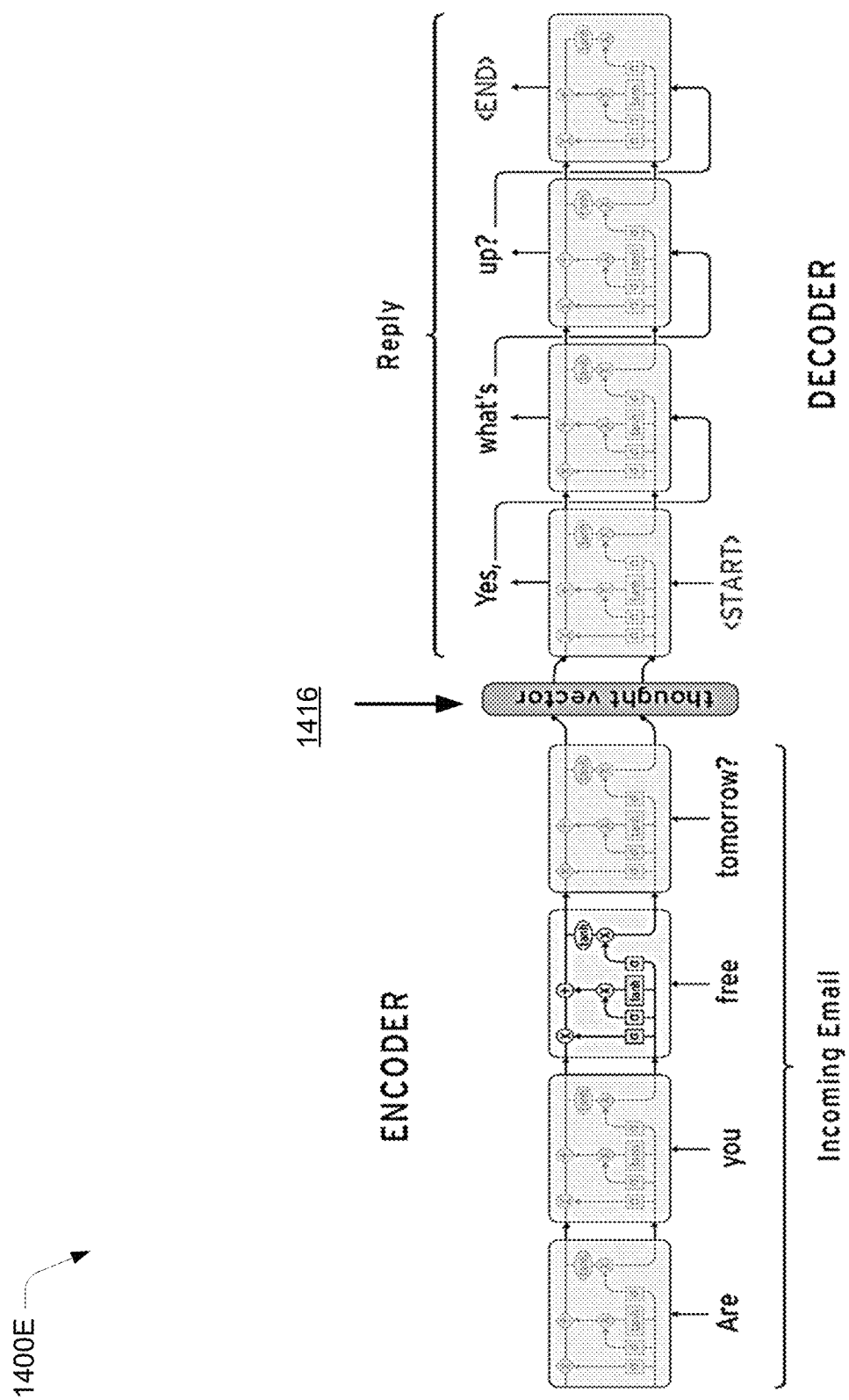
FIG. 14E illustrates a pictorial representation of a thought vector, an encoder-decoder generative model for deployment of a sentence phrasing system, according to an example embodiment of the present disclosure.

FIG. 14E illustrates a pictorial representation 1400E of a thought vector, an encoder-decoder generative model for deployment of the sentence phrasing system 110, according to an example embodiment of the present disclosure. The components of the system 110 mentioned above by way of FIGS. 1-14D may be deployed for the purpose of FIG. 14E and the description for the same may not be repeated herein. The pictorial representation 1400E may include a transmission of information from an encoder model to a decoder model through a thought vector 1416. The thought vector 1416 corresponding to the text document from the question entailment data 204 and the user question 216 may be constructed in the encoder network and decoded therefrom. For example, an input passage may be "We will pay You (or, if You request, the owner of the property) for loss of or damage as What is the coverage for my laptop which was damaged in an accident?" The decoded sentence may be "we will pay you or if you request the owner". In an example, the input passage may be "We will NOT pay for loss of or damage to mobile telephones, satellite navigation systems, televisions or DVD/Video recorders, I met with an accident and my laptop was damaged. Will my policy cover the laptop?". The decoded sentence may be "we will not pay for loss of or damage to equivalent". In an example, the input passage may be "We will NOT pay for money or equivalent (these include coins and bank notes used as legal tender, what is the coverage for money lost from car?". The decoded sentence may be "we will not pay for money or equivalent". In an example, the input passage may be "Born and raised in Houston, Tex., she performed in various singing and dancing competitions as a child". What areas did Beyoncé compete in when she was growing up?". The decoded sentence may be "she performed in various singing and dancing competitions as a time". In an example, the input passage may be "We will pay You (or, if You request, the owner of the property) for loss of or damage as a result of fire, theft or accidental damage to Personal belongings which are in or on Your Car. We will NOT pay more than €500 in any one Complete Year of Insurance; We will NOT pay for money or equivalent (these include coins and bank notes used as legal tender, cheques, drafts, postal and money orders, prize bonds, travelers cheques, saving stamps and certificates, gift tokens, luncheon vouchers, phonecards, travel tickets, credit, debit charge, cheque or cash dispenser cards, stamps, tickets, documents, financial securities and share certificates); We will NOT pay for loss of or damage to mobile telephones, satellite navigation systems, televisions or DVD/Video recorders, portable electronic devices including but not limited to ipods, ipads, tablets, music players, media players, laptop computers and in each case similar devices and their component parts or ancillary equipment or parts; We will NOT pay for jewelry; We will NOT pay for goods, tools or samples being carried for any trade or business; We will NOT pay for items which are covered by another insurance policy; We will NOT pay for theft of Personal belongings while Your Car is unattended unless Your Car is locked and the item(s) claimed for were not in view; We will NOT pay for loss of or damage to radios, mobile phones, audio, or audio visual equipment their component parts or ancillary equipment. Payment to anyone other than You will be made directly to the owner who must comply as far as possible with the terms, provisions, conditions and any Endorsements of this Policy. Their receipt of payment will end Our liability." The input question may be "What is the coverage for money lost from car?". The decoded sentence may be "we will pay you or if you request the owner".

Figure 14F:
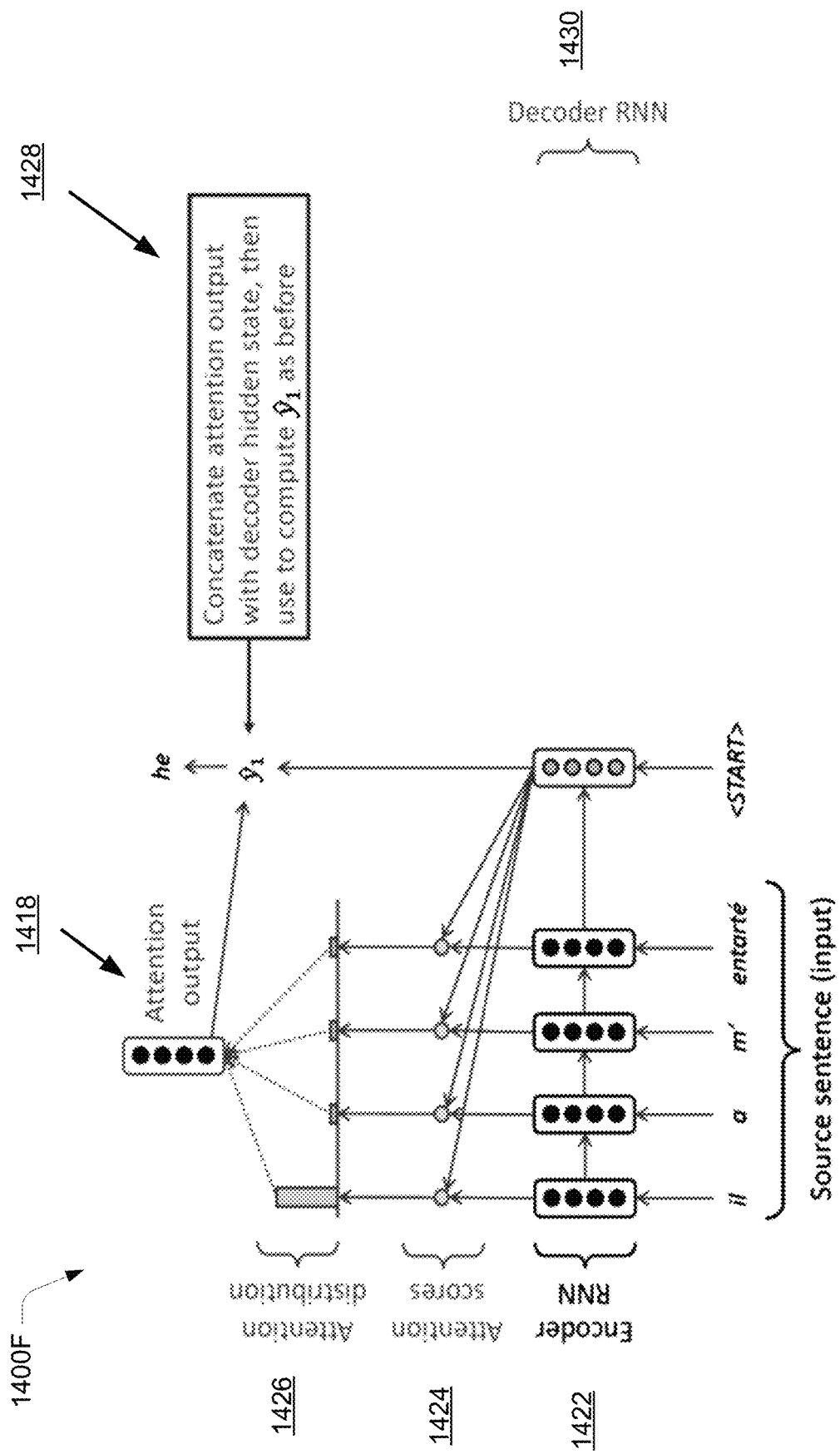
FIG. 14F illustrates a pictorial representation of a sequence-to-sequence with attention model for deployment of a sentence phrasing system, according to an example embodiment of the present disclosure.

FIG. 14F illustrates a pictorial representation 1400F of a sequence-to-sequence with attention model for deployment of the sentence phrasing system 110, according to an example embodiment of the present disclosure. The components of the system 110 mentioned above by way of FIGS. 1-14E may be deployed for the purpose of FIG. 14F and the description for the same may not be repeated herein. The pictorial representation 1400F may include an input source sentence 1420. The system 110 may be configured so that an encoder RNN 1422, an attention score 1424, and an attention distribution 1426 may process the input source sentence 1420 to generate an attention output 1418. The system 110 may further include a concatenation of the attention output 1418 by deploying a decoder RNN model 1430.

Figure 14G:
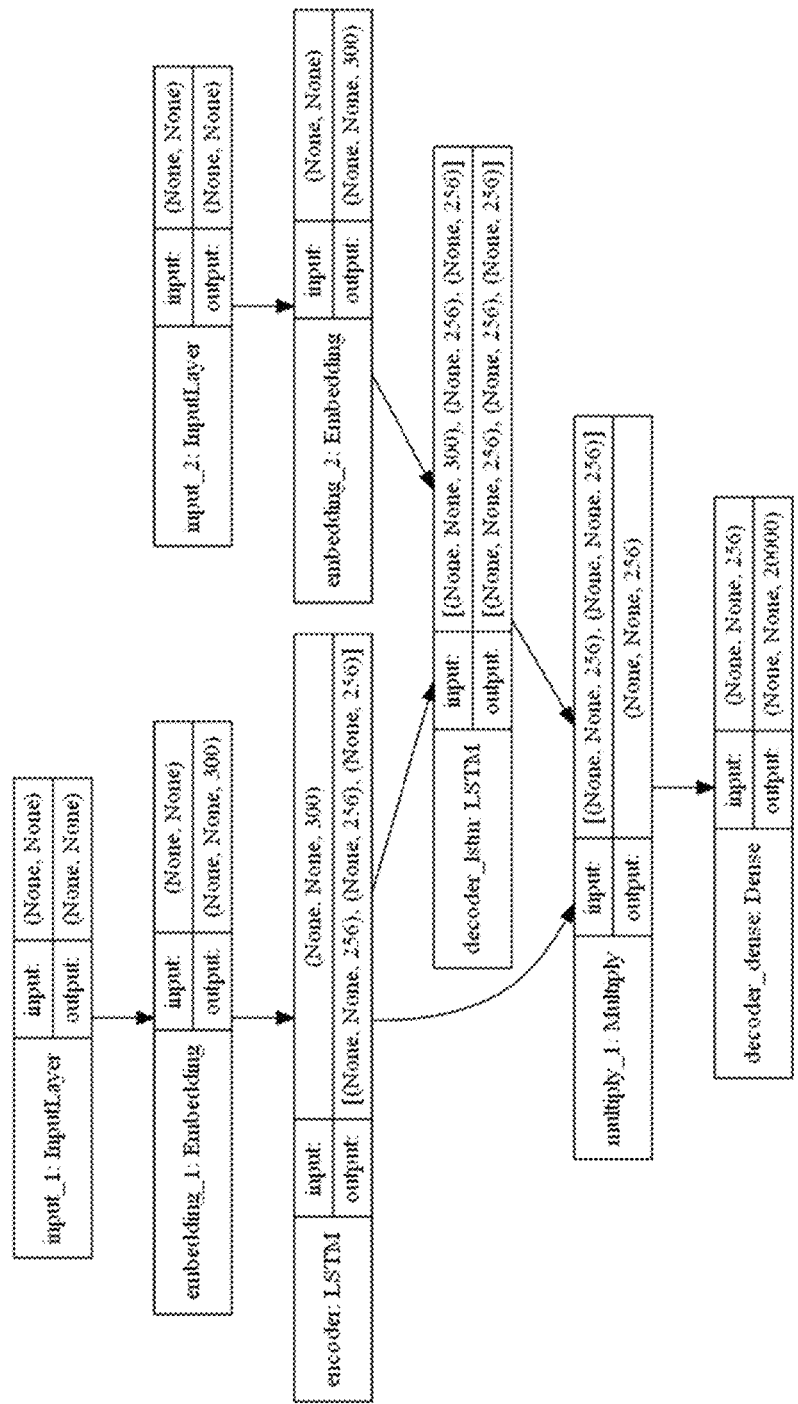
FIG. 14G illustrates a pictorial representation of a Long short-term memory (LSTM) sequence-to-sequence model with neural attention for the deployment of a sentence phrasing system, according to an example embodiment of the present disclosure.

FIG. 14G illustrates a pictorial representation 1400G of a Long short-term memory (LSTM) sequence-to-sequence model 1430 with neural attention for the deployment of the sentence phrasing system 110, according to an example embodiment of the present disclosure. The components of the system 110 mentioned above by way of FIGS. 1-14F may be deployed for the purpose of FIG. 14G and the description for the same may not be repeated herein. The pictorial representation 1400G may illustrate a Long short-term memory (LSTM) sequence-to-sequence model with neural attention that may include an attention mechanism combined in the RNN thereby allowing it to focus on certain parts of the input sequence when predicting a certain part of the output sequence, enabling easier learning and of higher quality.

Figure 14H:
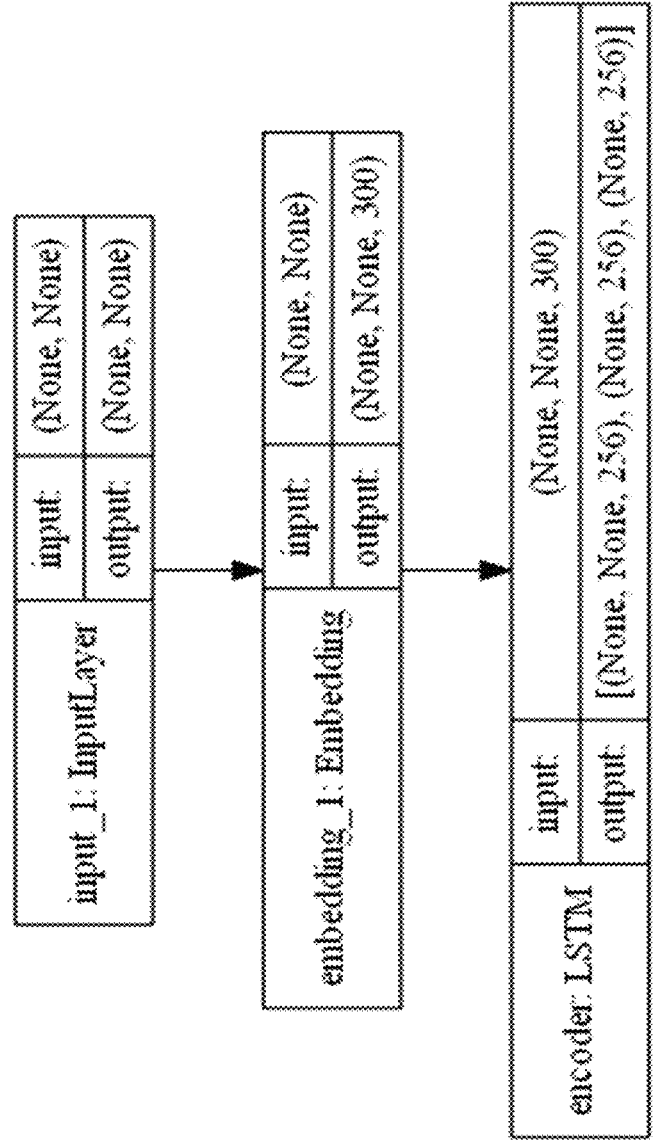
FIG. 14H illustrates a pictorial representation of an encoder model for the Long short-term memory (LSTM) sequence-to-sequence model from FIG. 14G for the deployment of a sentence phrasing system, according to an example embodiment of the present disclosure.

FIG. 14H illustrates a pictorial representation 1400H of an encoder model 1432 for the Long short-term memory (LSTM) sequence-to-sequence model with neural attention from FIG. 14G for the deployment of the sentence phrasing system 110, according to an example embodiment of the present disclosure. The components of the system 110 mentioned above by way of FIGS. 1-14G may be deployed for the purpose of FIG. 14H and the description for the same may not be repeated herein.

Figure 14I:
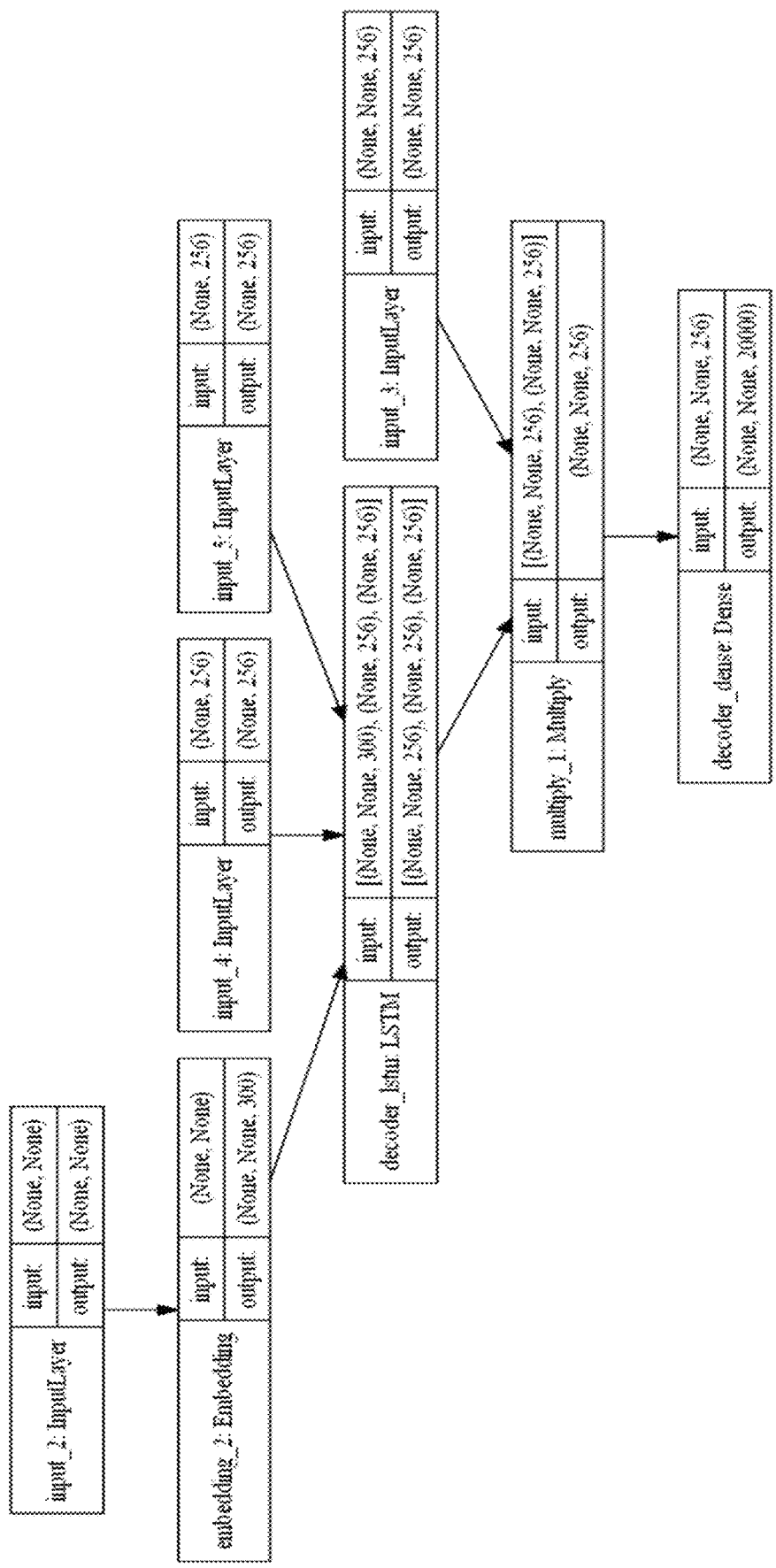
FIG. 14I illustrates a pictorial representation of a decoder model for the Long short-term memory (LSTM) sequence-to-sequence model from FIG. 14G for the deployment of a sentence phrasing system, according to an example embodiment of the present disclosure.

FIG. 14I illustrates a pictorial representation 1400 I of a decoder model 1434 for the Long short-term memory (LSTM) sequence-to-sequence model with neural attention from FIG. 14G for the deployment of the sentence phrasing system 110, according to an example embodiment of the present disclosure. The components of the system 110 mentioned above by way of FIGS. 1-14H may be deployed for the purpose of FIG. 14I and the description for the same may not be repeated herein.

Figure 15:
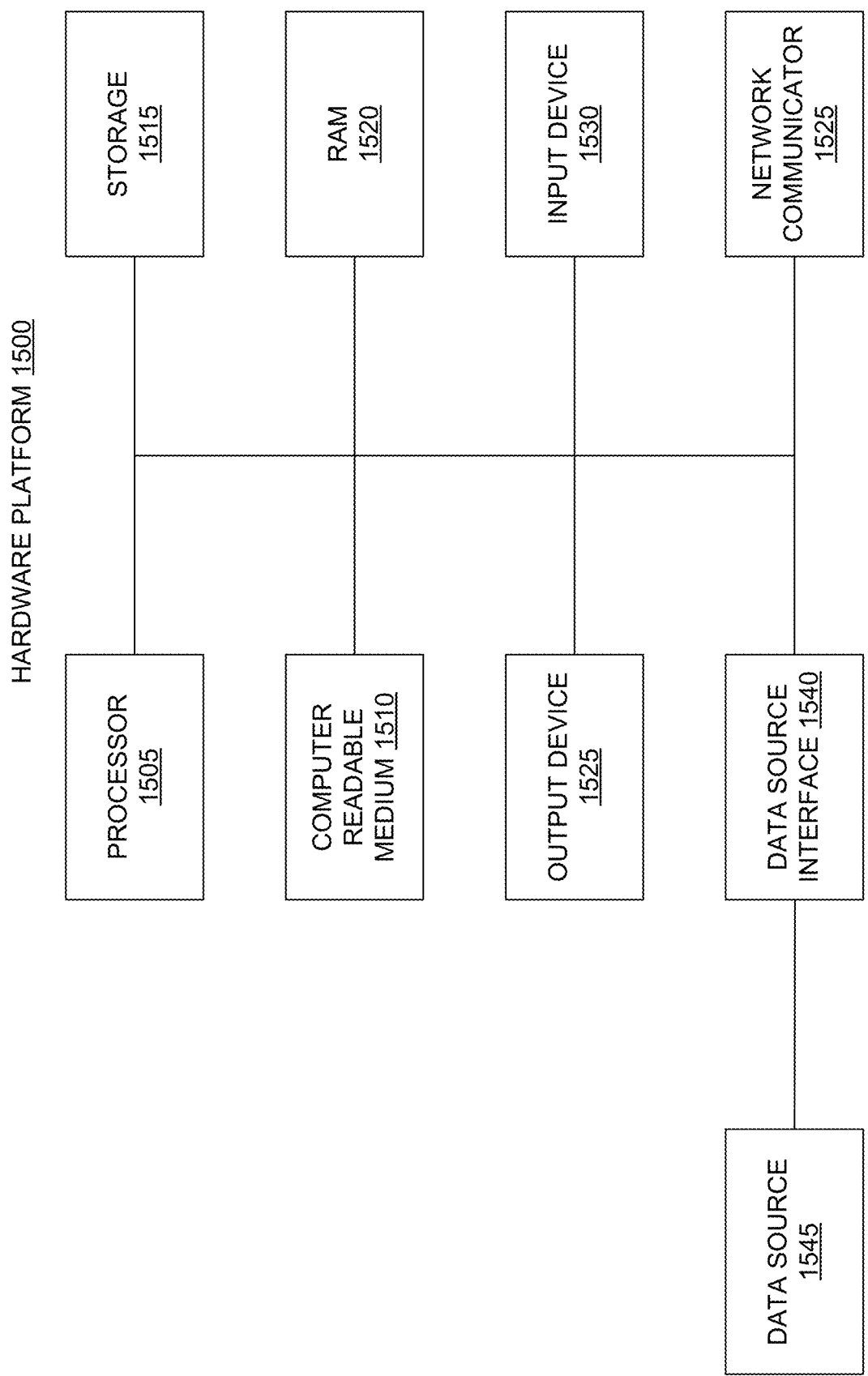
FIG. 15 illustrates a hardware platform for the implementation of a sentence phrasing system, according to an example embodiment of the present disclosure.

FIG. 15 illustrates a hardware platform 1500 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1500. The hardware platform 1500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 15, the hardware platform 1500 may be a computer system 1500 that may be used with the examples described herein. The computer system 1500 may represent a computational platform that includes components that may be in a server or another computer system. The computer system 1500 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1500 may include a processor 1505 that executes software instructions or code stored on a non-transitory computer-readable storage medium 1510 to perform methods of the present disclosure. The software code includes, for example, instructions to gather data and documents and analyze documents. In an example, the question data organizer 130, the answer creator 140 and the modeler 150 may be software codes or components performing these steps.

The instructions on the computer-readable storage medium 1510 are read and stored the instructions in storage 1515 or in random access memory (RAM) 1520. The storage 1515 provides a large space for keeping static data where at least some instructions could be stored for later execution. The stored instructions may be further compiled to generate other representations of the instructions and dynamically stored in the RAM 1520. The processor 1505 reads instructions from the RAM 1520 and performs actions as instructed.

The computer system 1500 further includes an output device 1525 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1500 further includes input device 1530 to provide a user or another device with mechanisms for entering data and/or otherwise interact with the computer system 1500. The input device may include, for example, a keyboard, a keypad, a mouse, or a touchscreen. In an example, the output of the answer creator 140 and the modeler 150 may be displayed on the output device 1525. Each of these output devices 1525 and input devices 1530 could be joined by one or more additional peripherals. In an example, the output device 1525 may be used to display the results of the data entailment requirement 202.

A network communicator 1535 may be provided to connect the computer system 1500 to a network and in turn to other devices connected to the network including other clients, servers, data stores, and interfaces, for instance. A network communicator 1535 may include, for example, a network adapter such as a LAN adapter or a wireless adapter. The computer system 1500 includes a data source interface 1540 to access data source 1545. A data source is an information resource. As an example, a database of exceptions and rules may be a data source. Moreover, knowledge repositories and curated data may be other examples of data sources.

Figure 16A:
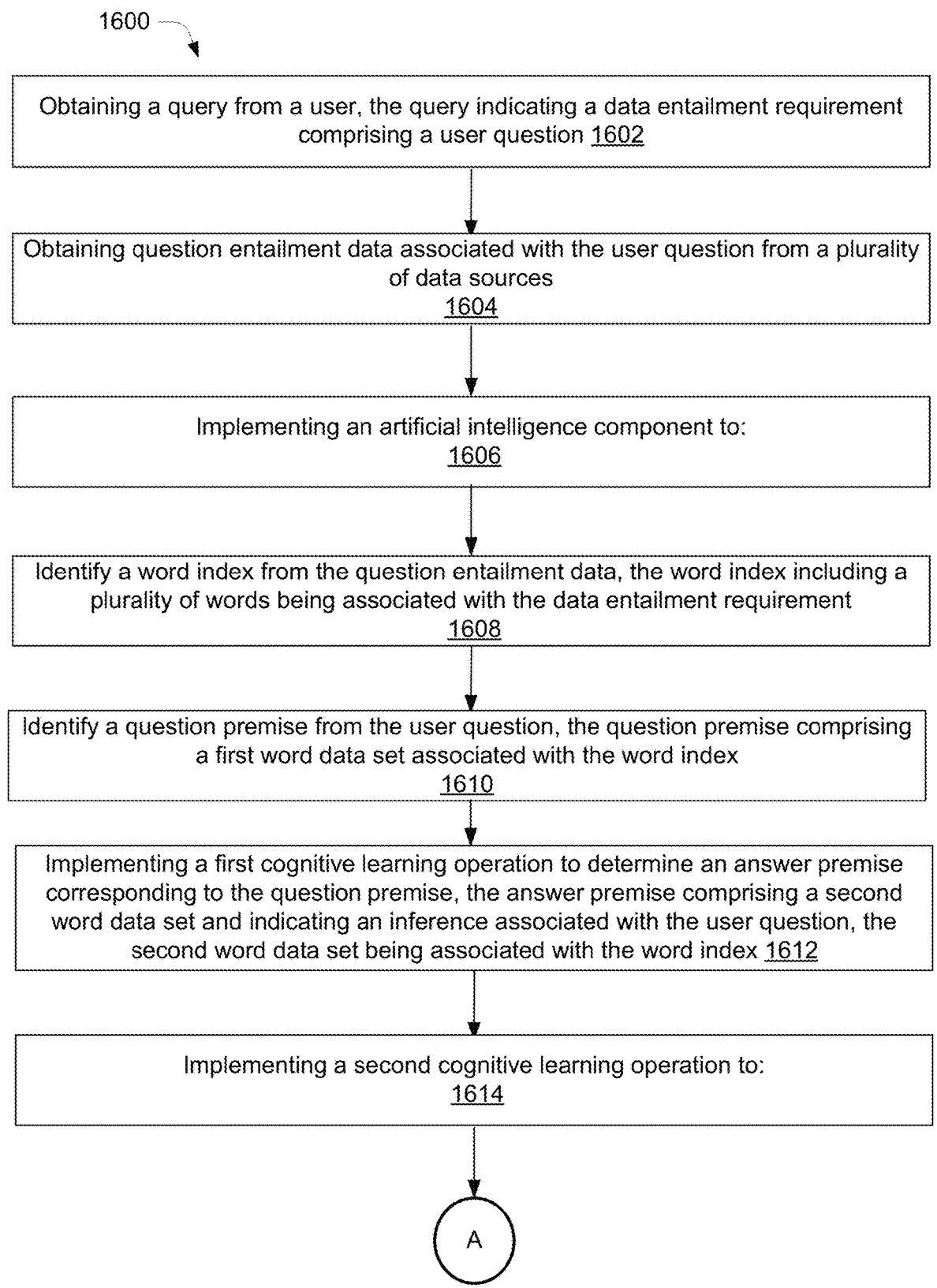
FIGS. 16A and 16B illustrate a process flowchart for a sentence phrasing system, according to an example embodiment of the present disclosure.
Figure 16B:
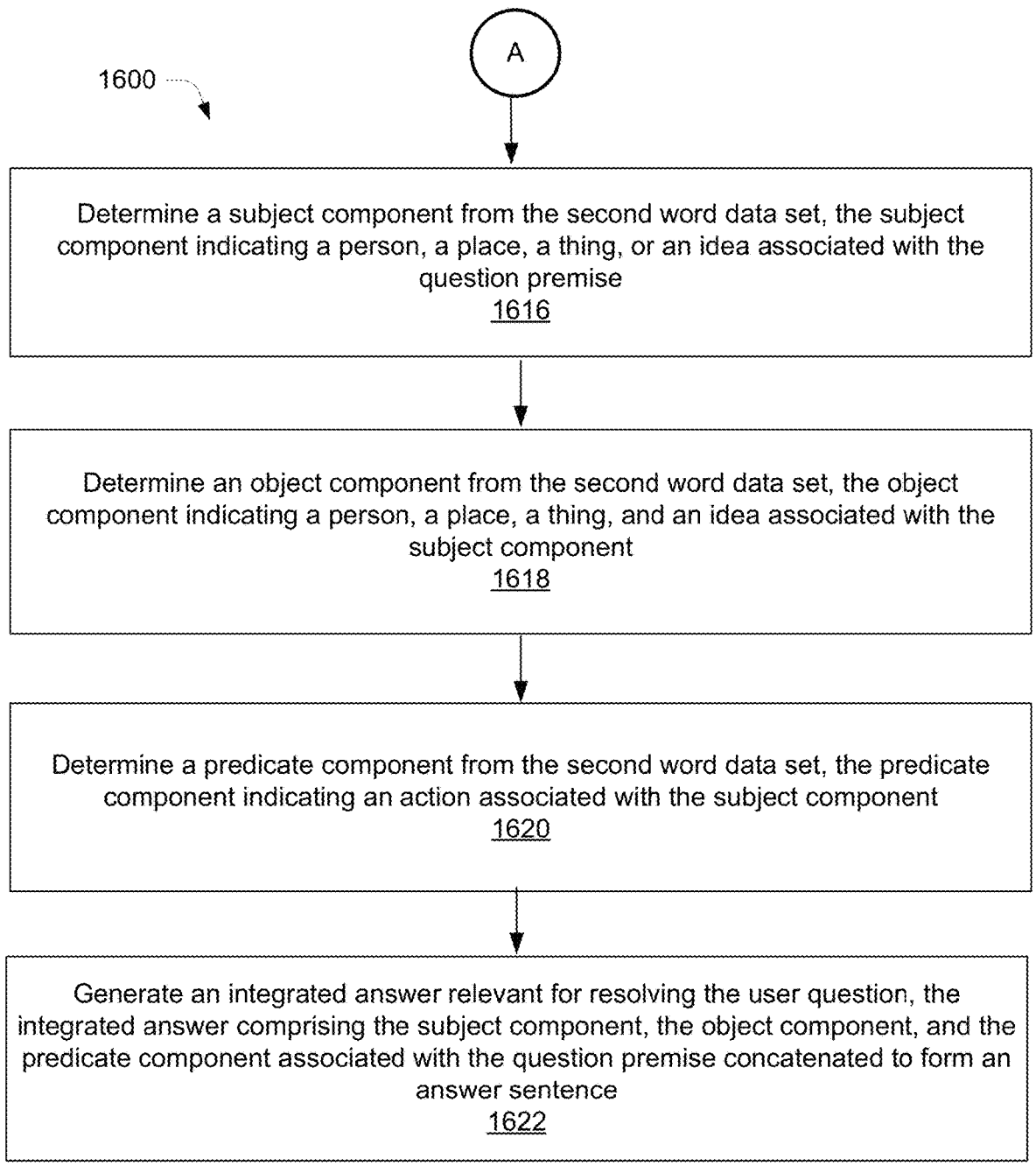

FIGS. 16A and 16B illustrate a method 1600 for the sentence phrasing system 110 according to an example embodiment of the present disclosure.

It should be understood that method steps are shown here for reference only and other combinations of the steps may be possible. Further, the method 1600 may contain some steps in addition to the steps shown in FIG. 16A and FIG. 16B. For the sake of brevity, construction and operational features of the system 100 which are explained in detail in the description of FIGS. 1-15 are not explained in detail in the description of FIG. 16. The method 1000 may be performed by a component of the system 110, such as the processor 120, the question data organizer 130, the answer creator 140 and the modeler 150.

At block 1602, a query may be obtained from a user. The query may be indicating a data entailment requirement 202 comprising the user question 216.

At block 1604, question entailment data 204 associated with the user question 216 may be obtained from a plurality of data sources 206. In an example, the plurality of data sources 206 may include a natural language data directory.

At block 1606, the artificial intelligence component 218 may be implemented.

At block 1608, the artificial intelligence component 218 may be implemented to identify the word index 208 from the question entailment data 204. The word index 208 may be including the plurality of words 210 being associated with the data entailment requirement 202.

At block 1610, the artificial intelligence component 218 may be implemented to identify the question premise 212 from the user question 216. The question premise 212 may be comprising the first word data set 214 associated with the word index 208.

At block 1612, the first cognitive learning operation 220 may be implemented to determine the answer premise 222 corresponding to the question premise 212. The answer premise 222 comprising the second-word data set 224 and indicating an inference associated with the user question 216. The second-word data set 224 may be associated with the word index 208.

At block 1614, the second cognitive learning operation 228 may be implemented.

At block 1616, a second cognitive learning operation 228 may be implemented to determine the subject component 230 from the second-word data set 224. The subject component 230 may be indicating a person, a place, a thing, or an idea associated with the question premise 212.

At block 1618, the second cognitive learning operation 228 may be implemented to determine the object component 232 from the second-word data set 224. The object component 232 may be indicating a person, a place, a thing, and an idea associated with the subject component 230.

At block 1620, the second cognitive learning operation 228 may be implemented to determine the predicate component 234 from the second-word data set 224. The predicate component 234 may be indicating an action associated with the subject component 230.

At block 1622, the second cognitive learning operation 228 may be implemented to generate the integrated answer 236 relevant for resolving the user question 216, the integrated answer 236 comprising the subject component 230, the object component 232, and the predicate component 234 associated with the question premise 212 concatenated to form the answer sentence 238.

In an example, the method 1600 may further include implementing the artificial intelligence component 218 to assign a numeral symbol 240 to each of the words in the word index 208. The method 1600 may further implement the second cognitive learning operation 228 to map the numeral symbol 240 for each of the words in the word index 208 with the first word data set 214 to determine a question premise 212 index and with the second-word data set 224 to determine an answer premise 222 index. As mentioned above, the question premise 212 index and the answer premise 222 index may be deployed by the system 110 to provide numeral symbol 240s corresponding to the user question 216 and the answer sentence 238 from the word index 208.

In an example, the method 1600 may implement the first cognitive learning operation 220 to create an answer map 226 associated with the question premise 212 by mapping the second-word data set 224 with the first word data set 214. In an example, the method 1600 may create a user question 216 library comprising the user question 216 and the answer sentence 238 associated with the user question 216. The user question 216 library may be deployed for generating an answer for a subsequent query In an example, the method 1600 may be practiced using a non-transitory computer-readable medium. In an example, the method 1600 may be a computer-implemented method.

The present disclosure provides for the sentence phrasing system 110 that may generate textual insights and answers while incurring minimal costs. Furthermore, the present disclosure may categorically analyze various parameters that may have an impact on the generation of automated answers for various user question 216 and analyze a document presented for entailment accordingly.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a question data organizer coupled to the processor, the question data organizer to:
      obtain a query from a user, the query indicating a data entailment requirement comprising a user question; and
      obtain question entailment data associated with the user question from a plurality of data sources;
   implement an artificial intelligence component to:
      identify a word index from the question entailment data, the word index including a plurality of words being associated with the data entailment requirement; and
      identify a question premise from the user question, the question premise comprising a first word data set associated with the word index;
   an answer creator coupled to the processor, the answer creator to implement a first cognitive learning operation to:
      determine an answer premise corresponding to the question premise, the answer premise comprising a second-word data set and indicating an inference associated with the user question, the second-word data set being associated with the word index; and
   a modeler coupled to the processor, the modeler to implement a second cognitive learning operation to:
      determine a subject component from the second-word data set, the subject component indicating one of a person, a place, a thing, and an idea associated with the question premise;
      determine an object component from the second-word data set, the object component indicating one of the person, the place, the thing, and the idea associated with the subject component;

determine a predicate component from the second-word data set, the predicate component indicating an action associated with the subject component; and generate an integrated answer relevant for resolving the user question, the integrated answer comprising the subject component, the object component, and the predicate component associated with the question premise concatenated to form an answer sentence.

2. The system as claimed in claim 1, wherein the artificial intelligence component is to map the plurality of words from the user question with a text corpus to identify the word index, the plurality of data sources comprising the text corpus.

3. The system as claimed in claim 1, wherein the question data organizer implements the artificial intelligence component to assign a numeral symbol to each of the words in the word index.

4. The system as claimed in claim 3, wherein the modeler implements the second cognitive learning operation to map the numeral symbol for each of the words in the word index with the first word data set to determine a question premise index and with the second-word data set to determine an answer premise index.

5. The system as claimed in claim 1, wherein the answer creator implements the first cognitive learning operation to create an answer map associated with the question premise by mapping the second-word data set with the first word data set.

6. The system as claimed in claim 1, wherein the modeler creates a user question library comprising the user question and the answer sentence associated with the user question.

7. The system as claimed in claim 6, wherein the modeler deploys the user question library for generating an answer for a subsequent query.

8. A method comprising:
obtaining, by a processor, a query from a user, the query indicating a data entailment requirement comprising a user question;
obtaining, by the processor, question entailment data associated with the user question from a plurality of data sources;
implementing, by the processor, an artificial intelligence component to:
identify a word index from the question entailment data, the word index including a plurality of words being associated with the data entailment requirement; and
identify a question premise from the user question, the question premise comprising a first word data set associated with the word index;
implementing, by the processor, a first cognitive learning operation to determine an answer premise corresponding to the question premise, the answer premise comprising a second-word data set and indicating an inference associated with the user question, the second-word data set being associated with the word index; and
implementing, by the processor, a second cognitive learning operation to:
determine a subject component from the second-word data set, the subject component indicating one of a person, a place, a thing, and an idea associated with the question premise;
determine an object component from the second-word data set, the object component indicating one of the person, the place, the thing, and the idea associated with the subject component;

determine a predicate component from the second-word data set, the predicate component indicating an action associated with the subject component; and generate an integrated answer relevant for resolving the user question, the integrated answer comprising the subject component, the object component, and the predicate component associated with the question premise concatenated to form an answer sentence.

9. The method as claimed in claim 8, wherein identifying the word index further comprises mapping the plurality of words from the user question with a text corpus to identify the word index, the plurality of data sources comprising the text corpus.

10. The method as claimed in claim 8, wherein the method further comprises implementing, by the processor, the artificial intelligence component to assign a numeral symbol to each of the words in the word index.

11. The method as claimed in claim 10, wherein the method further comprises implementing, by the processor, the second cognitive learning operation to map the numeral symbol for each of the words in the word index with the first word data set to determine a question premise index and with the second-word data set to determine an answer premise index.

12. The method as claimed in claim 8, wherein the method further comprises implementing, by the processor, the first cognitive learning operation to create an answer map associated with the question premise by mapping the second-word data set with the first word data set.

13. The method as claimed in claim 8, wherein the method further comprises creating, by the processor, a user question library comprising the user question and the answer sentence associated with the user question.

14. The method as claimed in claim 13, wherein the method further comprises deploying, by the processor, the user question library for generating an answer for a subsequent query.

15. A non-transitory computer readable medium including machine readable instructions that are executable by a processor to:
obtaining a query from a user, the query indicating a data entailment requirement comprising a user question;
obtain question entailment data associated with the user question from a plurality of data sources;
implement an artificial intelligence component to:
identify a word index from the question entailment data, the word index including a plurality of words being associated with the data entailment requirement; and
identify a question premise from the user question, the question premise comprising a first word data set associated with the word index;
implement a first cognitive learning operation to determine an answer premise corresponding to the question premise, the answer premise comprising a second-word data set and indicating an inference associated with the user question, the second-word data set being associated with the word index; and
implement a second cognitive learning operation to:
determine a subject component from the second-word data set, the subject component indicating one a person, a place, a thing, and an idea associated with the question premise;
determine an object component from the second-word data set, the object component indicating one of the person, the place, the thing, and the idea associated with the subject component;

determine a predicate component from the second-word data set, the predicate component indicating an action associated with the subject component; and generate an integrated answer relevant for resolving the user question, the integrated answer comprising the subject component, the object component, and the predicate component associated with the question premise concatenated to form an answer sentence.

16. The non-transitory computer-readable medium of claim 15, wherein identifying the word index further comprises mapping the plurality of words from the user question with a text corpus to identify the word index, the plurality of data sources comprising the text corpus.

17. The non-transitory computer-readable medium of claim 15, wherein the processor is to implement the artificial intelligence component to assign a numeral symbol to each of the words in the word index.

18. The non-transitory computer-readable medium of claim 17, wherein the processor is to implement the second cognitive learning operation to map the numeral symbol for each of the words in the word index with the first word data set to determine a question premise index and with the second-word data set to determine an answer premise index.

19. The non-transitory computer-readable medium of claim 15, wherein the processor is to implement the first cognitive learning operation to create an answer map associated with the question premise by mapping the second-word data set with the first word data set.

20. The non-transitory computer-readable medium of claim 15, wherein the processor is to create a user question library comprising the user question and the answer sentence associated with the user question and deploy the user question library for generating an answer for a subsequent query.

* * * * *